US012743456B2

(12) United States Patent
Coulter et al.

(10) Patent No.: US 12,743,456 B2
(45) Date of Patent: Sep. 22, 2026

(54) METHODS AND SYSTEMS FOR IDENTIFYING ANOMALOUS COMPUTER EVENTS TO DETECT SECURITY INCIDENTS

(71) Applicant: Auguria, Inc., Ladera Ranch, CA (US)

(72) Inventors: Christopher G. Coulter, Stuart, FL (US); James C. Briggs, Mansfield (GB)

(73) Assignee: Auguria, Inc., Ladera Ranch, CA (US)

( * ) Notice: Subject to any disclaimer, the term of this patent is extended or adjusted under 35 U.S.C. 154(b) by 0 days.

(21) Appl. No.: 18/793,579

(22) Filed: Aug. 2, 2024

(65) Prior Publication Data

US 2025/0053587 A1 Feb. 13, 2025

Related U.S. Application Data

(60) Provisional application No. 63/518,271, filed on Aug. 8, 2023.

(51) Int. Cl.
*G06F 16/30* (2019.01)
*G06F 16/2458* (2019.01)
(Continued)

(52) U.S. Cl.
CPC ........ *G06F 16/335* (2019.01); *G06F 16/2462* (2019.01); *G06F 16/353* (2019.01);
(Continued)

(58) Field of Classification Search
CPC ........... G06F 16/24528; G06F 16/2462; G06F 16/335; G06F 16/353; G06F 16/367; G06F 17/18; G06F 18/15; G06F 21/554
See application file for complete search history.

(56) References Cited

U.S. PATENT DOCUMENTS 9,338,013 B2 5/2016 Castellucci et al.
10,205,627 B2 * 2/2019 Kushmerick ......... H04L 67/131
(Continued)

FOREIGN PATENT DOCUMENTS

WO WO-2023154779 A2 8/2023

OTHER PUBLICATIONS

Extended European Search Report for European Application No. 23753645.3 mailed Sep. 25, 2025, 8 pages.
(Continued)

*Primary Examiner* — Diedra McQuitery
(74) *Attorney, Agent, or Firm* — COOLEY LLP

(57) ABSTRACT

A method includes receiving, from a plurality of sources, data associated with a plurality of events at the plurality of sources, standardizing the data based on a set of predefined standardization rules to define standardized data, and defining a vector representation for each event from the plurality of events based on the standardized data. The method includes assigning each event from the plurality of events to at least one cohort from a plurality of cohorts based on a similarity associated with the vector representation for that event and each cohort from the plurality of cohorts, generating, using at least one machine learning model, an ontology based on a set of cohorts from the plurality of cohorts and associated with the plurality of events, and storing the plurality of events as associated with the ontology such that the plurality of events can be filtered based on the ontology.

17 Claims, 19 Drawing Sheets

(51) Int. Cl.

| | |
|---|---|
| ***G06F 16/335*** | (2019.01) |
| ***G06F 16/353*** | (2025.01) |
| ***G06F 16/36*** | (2019.01) |
| ***G06F 21/55*** | (2013.01) |
| *G06F 16/2452* | (2019.01) |
| *G06F 17/18* | (2006.01) |
| *G06F 18/15* | (2023.01) |

(52) U.S. Cl.

CPC .......... *G06F 16/367* (2019.01); *G06F 21/554* (2013.01); *G06F 16/24528* (2019.01); *G06F 17/18* (2013.01); *G06F 18/15* (2023.01)

(56) References Cited

U.S. PATENT DOCUMENTS

| | | | | |
|---|---|---|---|---|
| 10,284,587 | B1 | 5/2019 | Schlatter et al. | |
| 10,673,880 | B1 | 6/2020 | Pratt et al. | |
| 11,182,481 | B1 | 11/2021 | Oliver et al. | |
| 12,238,119 | B1 | 2/2025 | Chivu et al. | |
| 12,373,557 | B2 | 7/2025 | Coulter | |
| 2015/0026027 | A1 | 1/2015 | Priess et al. | |
| 2015/0199224 | A1 | 7/2015 | Mihnev | |
| 2018/0075070 | A1* | 3/2018 | Chandrasekaran | G06F 16/367 |
| 2018/0219888 | A1 | 8/2018 | Apostolopoulos | |
| 2018/0255084 | A1 | 9/2018 | Kotinas et al. | |
| 2018/0285768 | A1* | 10/2018 | Karuppasamy | G06N 20/00 |
| 2019/0319987 | A1 | 10/2019 | Levy et al. | |
| 2021/0141897 | A1 | 5/2021 | Seifert et al. | |
| 2022/0179892 | A1 | 6/2022 | Kermode et al. | |
| 2022/0277176 | A1 | 9/2022 | Bhatia et al. | |
| 2022/0292525 | A1 | 9/2022 | Ash et al. | |
| 2022/0309087 | A1 | 9/2022 | Müller et al. | |
| 2022/0368586 | A1 | 11/2022 | Stewart et al. | |
| 2023/0208869 | A1 | 6/2023 | Bisht et al. | |
| 2023/0252140 | A1 | 8/2023 | Coulter | |
| 2024/0256418 | A1* | 8/2024 | Titon | H04L 41/5064 |
| 2025/0086391 | A1* | 3/2025 | Kempf | G06F 16/3347 |

OTHER PUBLICATIONS

Jarabo-Penas et al., "Bus Headways Analysis for Anomaly Detection," IEEE Transactions on Intelligent Transportation Systems Year: 2022 I vol. 23, Issue: 10 I Journal Article I Publisher: IEEE, pp. 18975-18988.

Non-Final Office Action for U.S. Appl. No. 18/166,654 mailed Nov. 22, 2024, 28 pages.

Notice of Allowance for U.S. Appl. No. 18/166,654 mailed Apr. 9, 2025, 10 pages.

Park et al., "Autoencoder for Network Anomaly Detection," 2022 IEEE International Symposium on Measurements & Networking (M&N) Year: 2022 I Conference Paper I Publisher: IEEE., 6 pages.

Briggs, "Unlocking the Power of Ontologies for Advanced Security Analytics—Part 3," retrieved from URL: https://auguria.io/insights/unlocking-the-power-of-ontologies-for-advanced-security-analytics/, Oct. 17, 2024, 13 pages.

"Science Direct Topics". ScienceDirect Journals & Books [Internet]. Elsevier B.V. c2023. Available from: https://www.sciencedirect.com/topics/computer-science/log-record-event. 8 pages.

International Preliminary Report on Patentability for International Application No. PCT/US2023/062259 mailed Aug. 22, 2024, 7 pages.

International Search Report and Written Opinion for International Application No. PCT/US2023/062259, mailed on Jul. 11, 2023, 13 pages.

International Search Report and Written Opinion for PCT Application No. PCT/US2024/040863 mailed Oct. 18, 2024, 13 pages.

Invitation to Pay Fee for International Application No. PCT/US2023/062259 dated Apr. 20, 2023, 2 pages.

Joshi et al., "Intelligent clustering scheme for log data streams". In Computational Linguistics and Intelligent Text Processing: 15th International Conference, CICLing 2014, Kathmandu, Nepal, Apr. 6-12, 2014, Proceedings, Part II 15 2014 (pp. 454-465). Springer Berlin Heidelberg.

Rochford, "Why Your Next SIEM Will Analyze Vectors—Part 1," retrieved from URL:https://auguria.io/insights/why-your-next-siem-will-analyze-vectors/, Oct. 17, 2024, 12 pages.

Rochford, "Why Your Next SIEM Will Analyze Vectors—Part 2," retrieved from URL:https://auguria.io/insights/why-your-next-siem-will-analyze-vectors-part-2/, Oct. 17, 2024, 15 pages.

Warren "How to Detect Pass-the-Hash Attacks", Internet Archive, WayBack Machine. [Internet]. web.archive.org; Feb. 2019. 12. Available from: https://web.archive.org/web/20211205071738/https://stealthbits.com/blog/how-to-detect-pass-the-hash-attacks/, 18 pages.

* cited by examiner

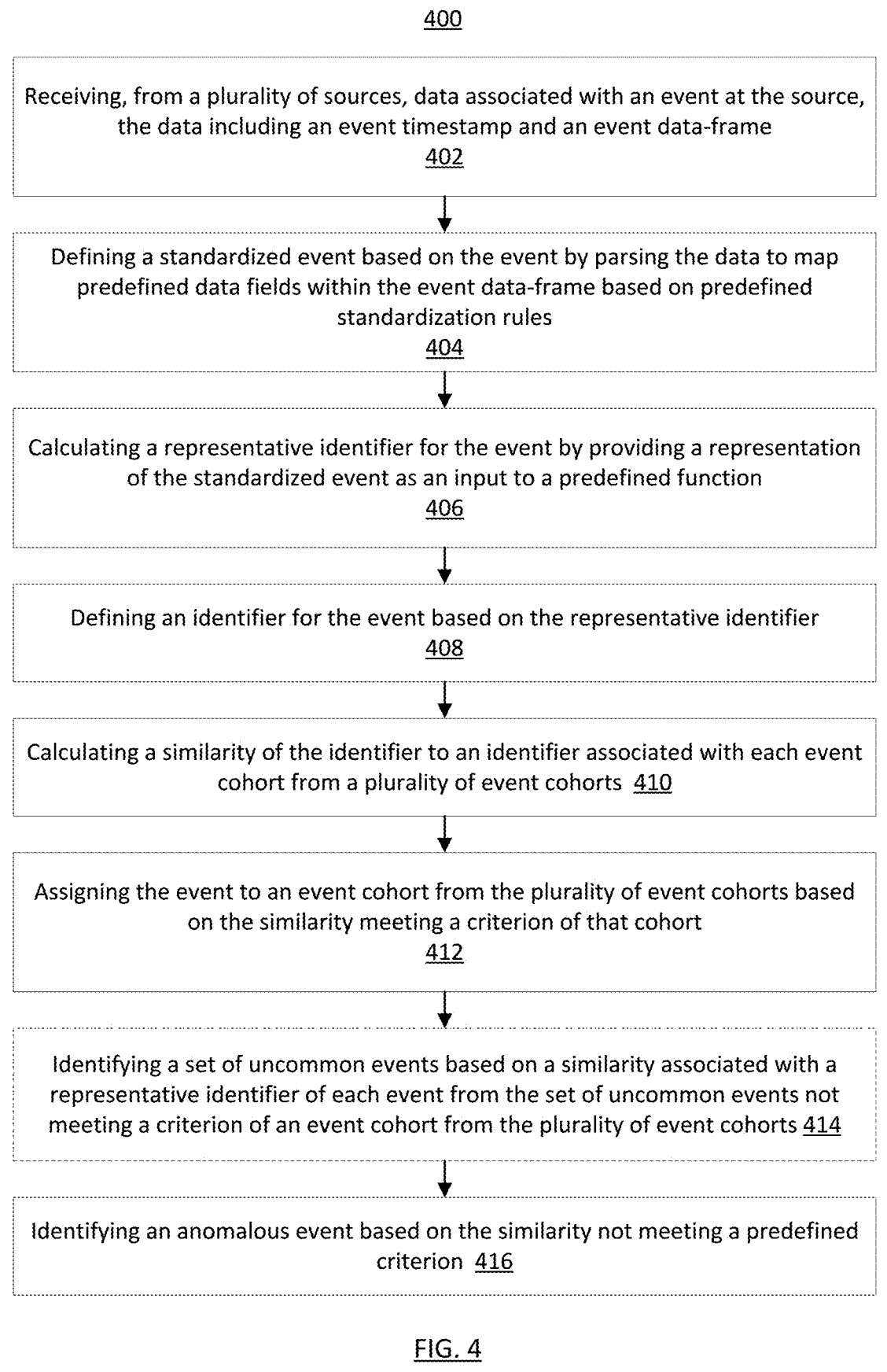

400

Receiving, from a plurality of sources, data associated with an event at the source, the data including an event timestamp and an event data-frame
402

↓

Defining a standardized event based on the event by parsing the data to map predefined data fields within the event data-frame based on predefined standardization rules
404

↓

Calculating a representative identifier for the event by providing a representation of the standardized event as an input to a predefined function
406

↓

Defining an identifier for the event based on the representative identifier
408

↓

Calculating a similarity of the identifier to an identifier associated with each event cohort from a plurality of event cohorts 410

↓

Assigning the event to an event cohort from the plurality of event cohorts based on the similarity meeting a criterion of that cohort
412

↓

Identifying a set of uncommon events based on a similarity associated with a representative identifier of each event from the set of uncommon events not meeting a criterion of an event cohort from the plurality of event cohorts 414

↓

Identifying an anomalous event based on the similarity not meeting a predefined criterion 416

FIG. 4

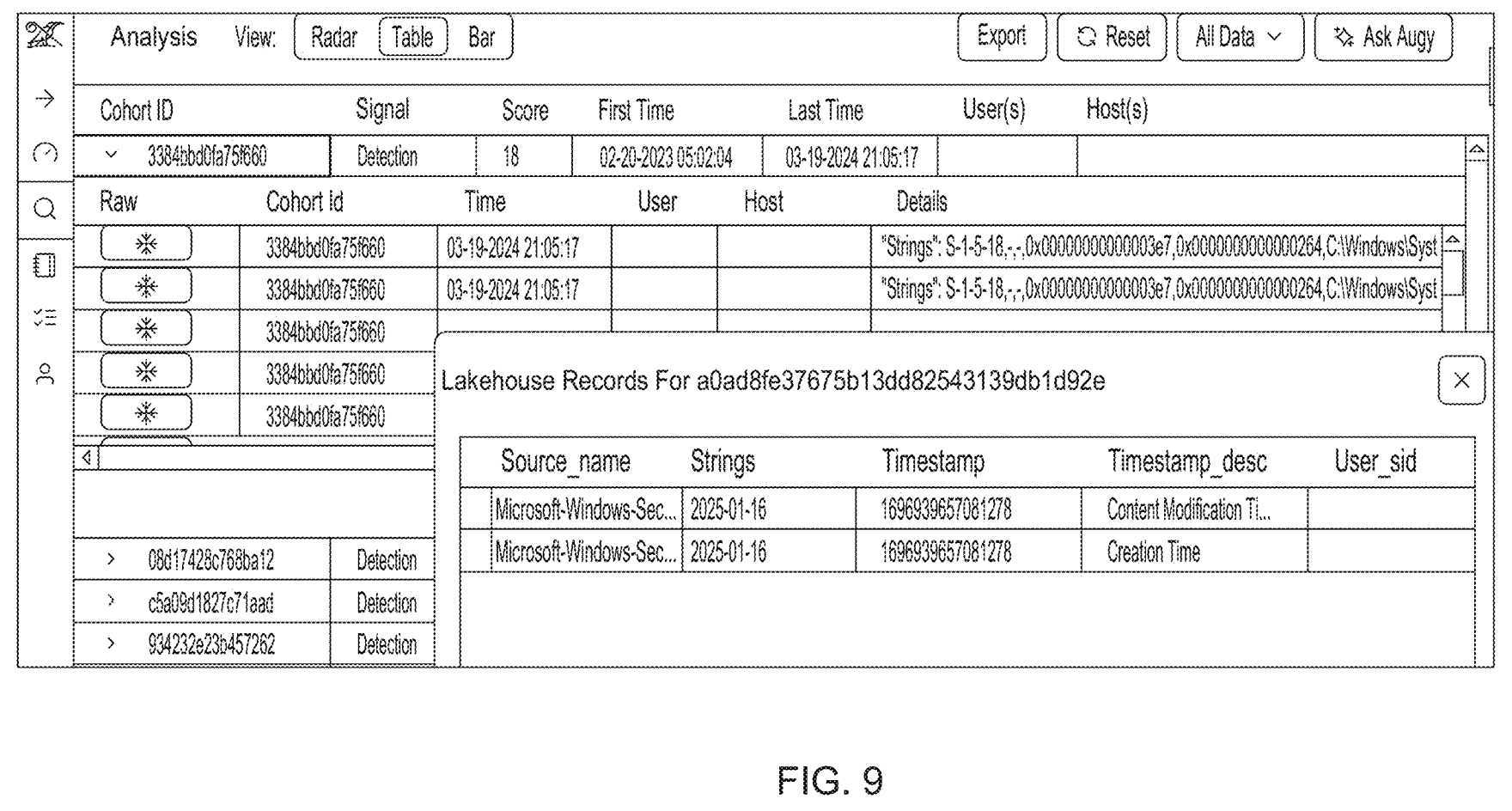

Analysis View: Radar Table Bar Export Reset All Data Ask Augy

| Cohort ID | Signal | Score | First Time | Last Time | User(s) | Host(s) |
|---|---|---|---|---|---|---|
| 3384bbd0fa75f660 | Detection | 18 | 02-20-2023 05:02:04 | 03-19-2024 21:05:17 | | |

| Raw | Cohort Id | Time | User | Host | Details |
|---|---|---|---|---|---|
| | 3384bbd0fa75f660 | 03-19-2024 21:05:17 | | | "Strings": S-1-5-18,-,-,0x00000000000003e7,0x0000000000000264,C:\Windows\Syst |
| | 3384bbd0fa75f660 | 03-19-2024 21:05:17 | | | "Strings": S-1-5-18,-,-,0x00000000000003e7,0x0000000000000264,C:\Windows\Syst |
| | 3384bbd0fa75f660 | | | | |
| | 3384bbd0fa75f660 | | | | |
| | 3384bbd0fa75f660 | | | | |

| Cohort ID | Signal |
|---|---|
| 08d17428c768ba12 | Detection |
| c5a09d1827c71aad | Detection |
| 934232e23b457262 | Detection |

Lakehouse Records For a0ad8fe37675b13dd82543139db1d92e

| Source_name | Strings | Timestamp | Timestamp_desc | User_sid |
|---|---|---|---|---|
| Microsoft-Windows-Sec... | 2025-01-16 | 1696939657081278 | Content Modification Ti... | |
| Microsoft-Windows-Sec... | 2025-01-16 | 1696939657081278 | Creation Time | |

FIG. 9

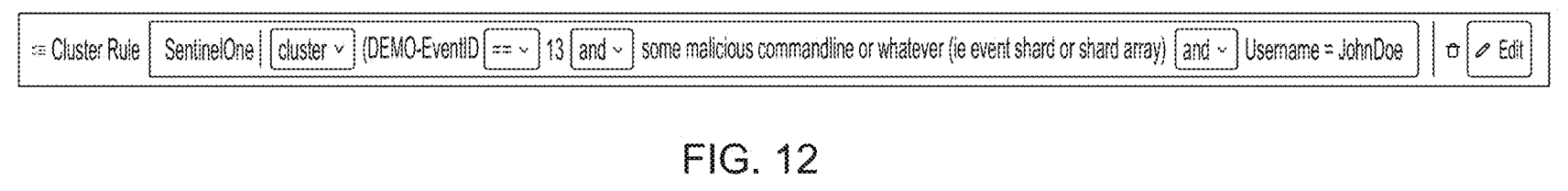

Cluster Rule
SentinelOne
cluster
(DEMO-EventID
==
13
and
some malicious commandline or whatever (ie event shard or shard array)
and
Username = JohnDoe
Edit

FIG. 12

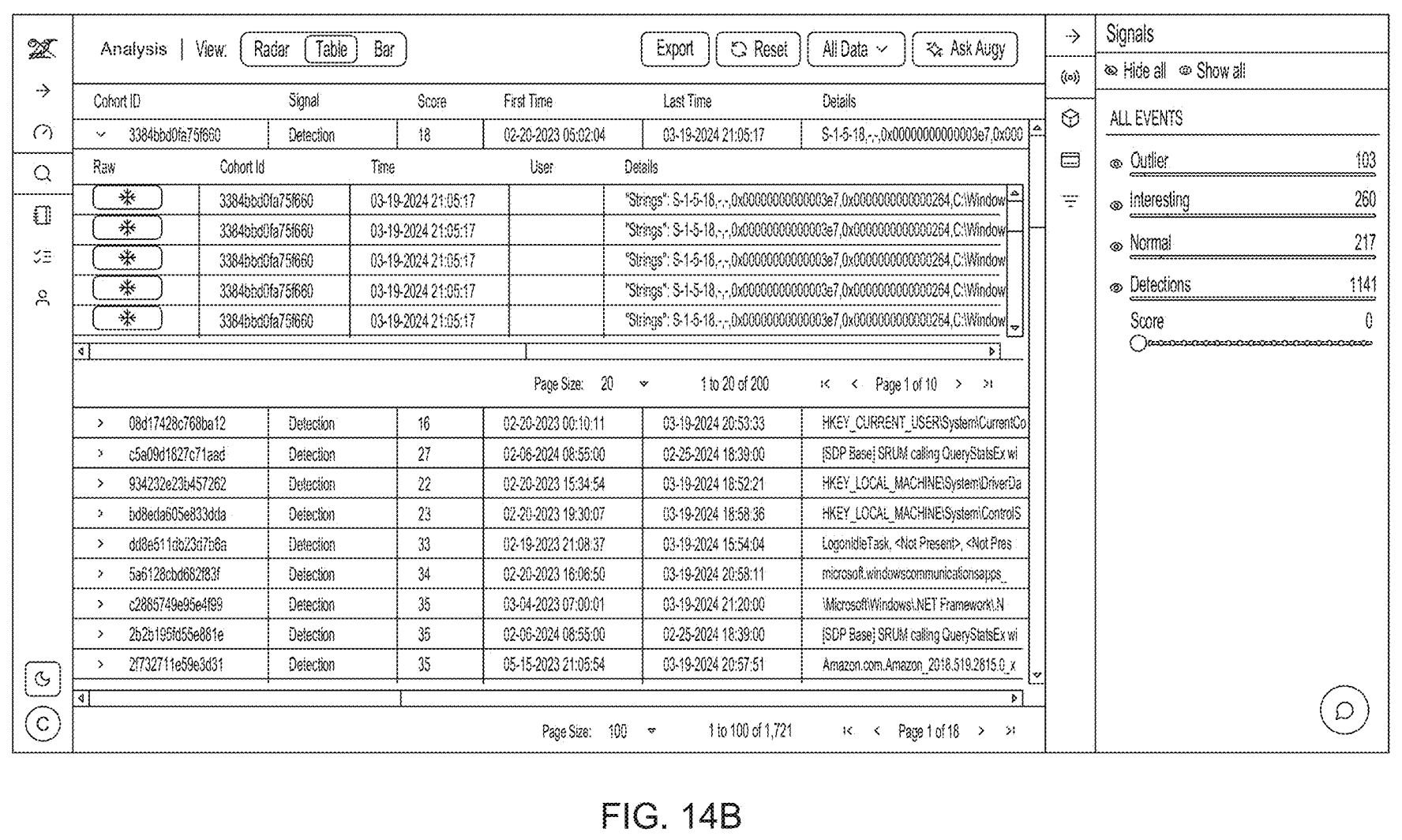

Analysis | View: Radar Table Bar

Export Reset All Data Ask Augy

| Cohort ID | Signal | Score | First Time | Last Time | Details |
|---|---|---|---|---|---|
| 3384bbd0fa75f660 | Detection | 18 | 02-20-2023 05:02:04 | 03-19-2024 21:05:17 | S-1-5-18,-,-,0x00000000000003e7,0x000 |

| Raw | Cohort Id | Time | User | Details |
|---|---|---|---|---|
| * | 3384bbd0fa75f660 | 03-19-2024 21:05:17 | | "Strings": S-1-5-18,-,-,0x00000000000003e7,0x0000000000000264,C:\Window |
| * | 3384bbd0fa75f660 | 03-19-2024 21:05:17 | | "Strings": S-1-5-18,-,-,0x00000000000003e7,0x0000000000000264,C:\Window |
| * | 3384bbd0fa75f660 | 03-19-2024 21:05:17 | | "Strings": S-1-5-18,-,-,0x00000000000003e7,0x0000000000000264,C:\Window |
| * | 3384bbd0fa75f660 | 03-19-2024 21:05:17 | | "Strings": S-1-5-18,-,-,0x00000000000003e7,0x0000000000000264,C:\Window |
| * | 3384bbd0fa75f660 | 03-19-2024 21:05:17 | | "Strings": S-1-5-18,-,-,0x00000000000003e7,0x0000000000000264,C:\Window |

Page Size: 20 1 to 20 of 200 Page 1 of 10

| Cohort ID | Signal | Score | First Time | Last Time | Details |
|---|---|---|---|---|---|
| 08d17428c768ba12 | Detection | 16 | 02-20-2023 00:10:11 | 03-19-2024 20:53:33 | HKEY_CURRENT_USER\System\CurrentCo |
| c5a09d1827c71aad | Detection | 27 | 02-06-2024 08:55:00 | 02-25-2024 18:39:00 | [SDP Base] SRUM calling QueryStatsEx wi |
| 934232e23b457262 | Detection | 22 | 02-20-2023 15:34:54 | 03-19-2024 18:52:21 | HKEY_LOCAL_MACHINE\System\DriverDa |
| bd8eda605e833dda | Detection | 23 | 02-20-2023 19:30:07 | 03-19-2024 18:58:36 | HKEY_LOCAL_MACHINE\System\ControlS |
| dd8e511db23d7b8a | Detection | 33 | 02-19-2023 21:08:37 | 03-19-2024 15:54:04 | LogonIdleTask, <Not Present>, <Not Pres |
| 5a6128cbd682f83f | Detection | 34 | 02-20-2023 16:06:50 | 03-19-2024 20:58:11 | microsoft.windowscommunicationsapps_ |
| c2865749e95e4f99 | Detection | 35 | 03-04-2023 07:00:01 | 03-19-2024 21:20:00 | \Microsoft\Windows\.NET Framework\.N |
| 2b2b195fd55e881e | Detection | 35 | 02-06-2024 08:55:00 | 02-25-2024 18:39:00 | [SDP Base] SRUM calling QueryStatsEx wi |
| 2f732711e59e3d31 | Detection | 35 | 05-15-2023 21:05:54 | 03-19-2024 20:57:51 | Amazon.com.Amazon_2018.519.2815.0_x |

Page Size: 100 1 to 100 of 1,721 Page 1 of 18

Signals

Hide all Show all

ALL EVENTS

| | |
|---|---|
| Outlier | 103 |
| Interesting | 260 |
| Normal | 217 |
| Detections | 1141 |
| Score | 0 |

FIG. 14B

FIG. 16A
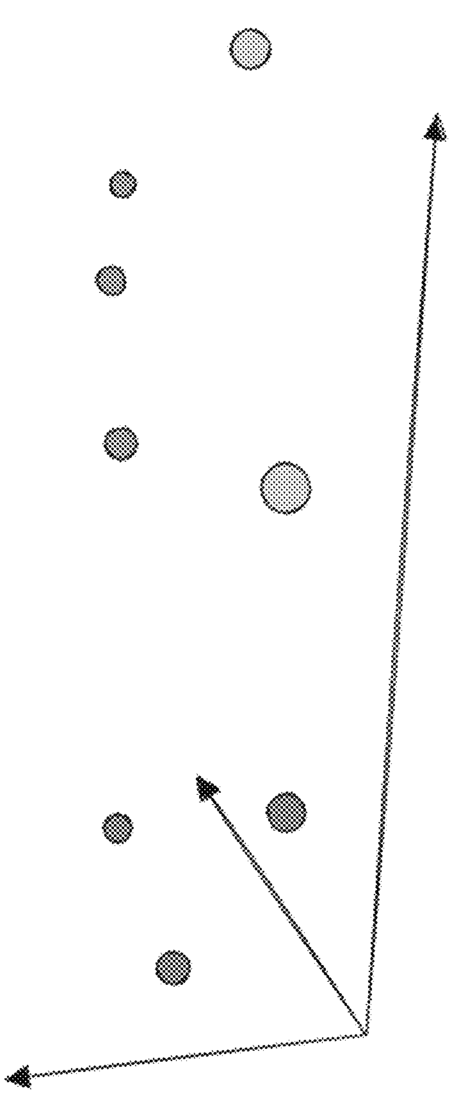

FIG. 16B
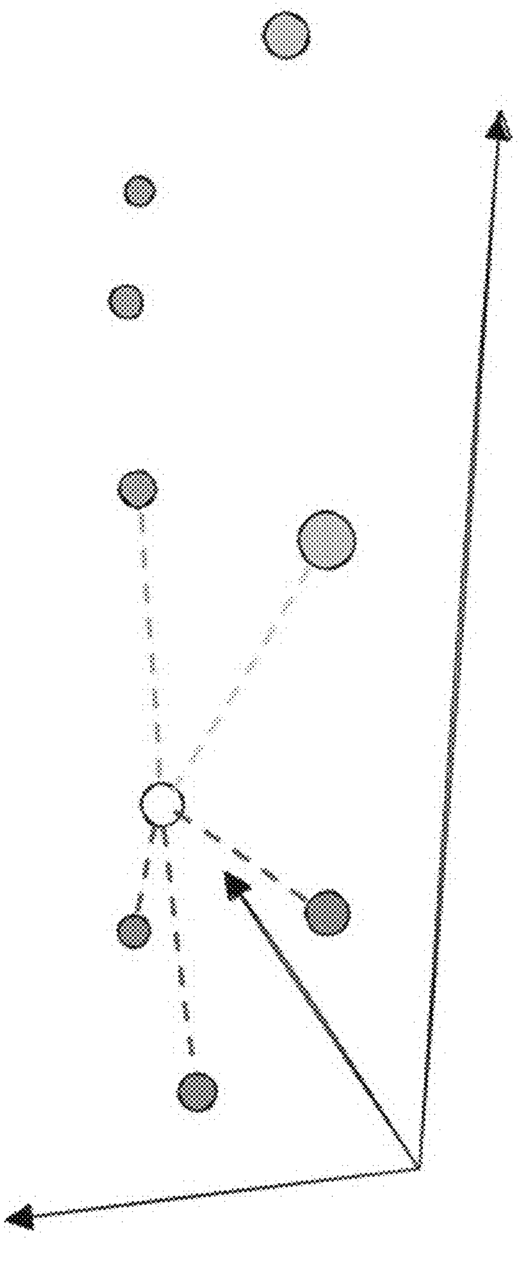

METHODS AND SYSTEMS FOR IDENTIFYING ANOMALOUS COMPUTER EVENTS TO DETECT SECURITY INCIDENTS

CROSS-REFERENCE TO RELATED APPLICATIONS

This application claims priority to and the benefit of U.S. Provisional Patent Application No. 63/518,271, titled "Methods and Systems for Identifying Anomalous Computer Events to Detect Security Incidents," filed Aug. 8, 2023, the disclosure of which is incorporated herein by reference in its entirety.

This application is related to U.S. Non-provisional patent application Ser. No. 18/166,654, titled "Methods and Systems for Identifying Anomalous Computer Events to Detect Security Incidents," filed Feb. 9, 2023, and U.S. Provisional Patent Application No. 63/308,391, titled "Methods and Systems for Identifying Commonality of Computer Events," filed Feb. 9, 2022, the disclosure of each of which is incorporated herein by reference in its entirety.

BACKGROUND

A computer and its associated hardware and software can produce a manifest of its activity in the form of events. In some known systems, these events are captured natively by the kernel or operating system and applications either natively or from third party software, (e.g., Endpoint Detection & Response software). In some known systems, this data is stored locally or centrally within an enterprise as log data (e.g., security events, audit events, event logs, etc.) that are generated by various systems and/or devices. Often these events may be transmitted to and stored in a cloud-based database or other central repository (e.g., security information and event management). In some known systems, the data can be retained for periods of time within an enterprise due to compliance and other security reasons. Organizations can make it a policy to store information for a predetermined length of time. Storage of this data can be costly and inherently difficult to leverage in the event of an incident due to the sheer volume of data. Event data is inherently sensitive and often not shared outside of an enterprise or organization. Much of computer event data represents common repetitive events that are not typically referenced or later reviewed. Such data are nonetheless still recorded and saved indiscriminately.

Additionally, the types of circumstances that can arise to make an event anomalous can constantly change as computer systems and networks as well as threats and attacks on computer systems are constantly changing. Anticipating various circumstances that can lead to such anomalous events can be computationally difficult. Thus, there is a need for dynamically determining computer events that are atypical (e.g., anomalous, uncommon, different, etc.) to allow for the identification and storage of events that may indicate a potential security incident, without overwhelming computing resources and is capable of scaling to larger groups of data.

SUMMARY

In some embodiments, a method includes receiving, from a plurality of sources, data associated with a plurality of events at the plurality of sources. The method includes standardizing the data based on a set of predefined standardization rules to define standardized data. The method includes defining a vector representation for each event from the plurality of events based on the standardized data. The method includes assigning each event from the plurality of events to at least one cohort from a plurality of cohorts based on a similarity associated with the vector representation for that event and each cohort from the plurality of cohorts. The method includes generating, using at least one machine learning model, an ontology based on a set of cohorts from the plurality of cohorts and associated with the plurality of events. The method includes storing the plurality of events as associated with the ontology such that the plurality of events can be filtered based on the ontology.

In some embodiments, a method includes receiving, from a source from a plurality of sources, data associated with an event at the source, the data including an event timestamp and an event data-frame. The method includes defining a standardized event based on the event by parsing the data to map predefined data fields within the event data-frame based on predefined standardization rules. The method includes calculating an identifier for the event by providing a representation of the standardized event as an input to a predefined function. The method includes calculating a similarity of the identifier to an identifier associated with each event cohort from a plurality of event cohorts. The method includes assigning the event to an event cohort from the plurality of event cohorts based on the similarity meeting a criterion of that cohort. The method includes assigning the event to an ontology from a plurality of ontologies based on the event cohort being associated with the ontology. The method includes storing the event as associated with the ontology such that the event can be filtered based on the ontology.

In some embodiments, a non-transitory processor-readable medium stores code representing instructions to be executed by one or more processors. The instructions include code to cause the one or more processors to receive, from a plurality of sources, data associated with a plurality of events at the plurality of sources. The instructions include code to cause the one or more processors to standardize the data based on a set of predefined standardization rules to define standardized data. The instructions include code to cause the one or more processors to define a vector representation for each event from the plurality of events based on the standardized data. The instructions include code to cause the one or more processors to calculate a similarity associated with the vector representation for each event from the plurality of events and a plurality of cohorts using a coarse sorting process and a fine sorting process. The instructions include code to cause the one or more processors to assign each event from the plurality of events to at least one cohort from the plurality of cohorts based on the similarity associated with the vector representation for that event and each cohort from the plurality of cohorts. The instructions include code to cause the one or more processors to assign each cohort from the plurality of cohorts to an ontology. The instructions include code to cause the one or more processors to generate a score associated with each event from the plurality of events based on the ontology. The instructions include code to cause the one or more processors to identify an anomalous event from the plurality of events based on the score associated with that event not meeting a criterion.

BRIEF DESCRIPTION OF THE DRAWINGS

FIG. 4 shows a flowchart of a method for identifying an anomalous event, according to an embodiment.

FIG. 9 shows an image of an event data interface, according to an embodiment.

FIG. 12 shows an image of a cluster rule, according to an embodiment.

FIGS. 14A-14B depict examples of an output dashboard, according to embodiments.

FIGS. 16A-16B depict an example vector embedding, according to an embodiment.

DETAILED DESCRIPTION

Figure 1:
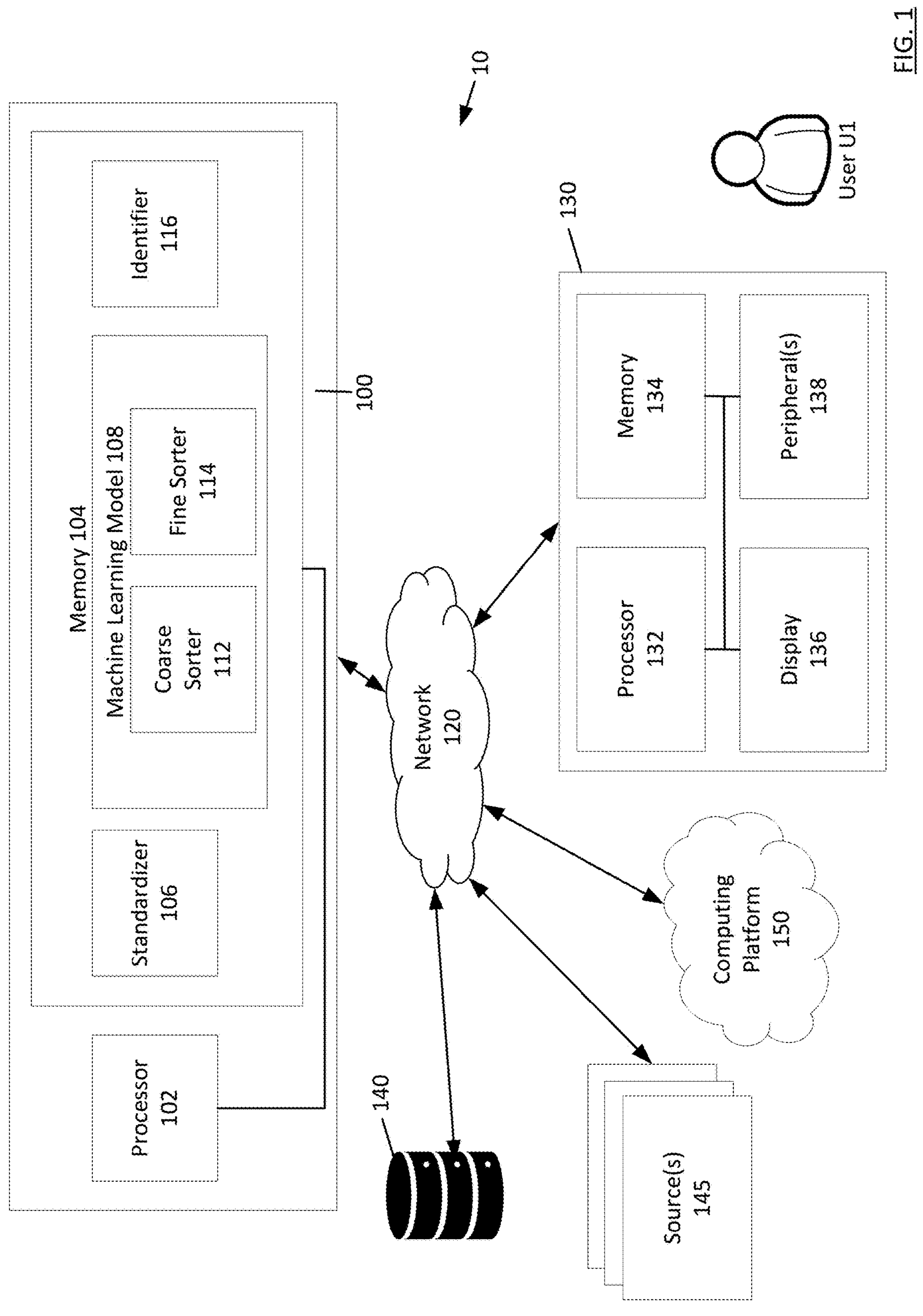
FIG. 1 shows a block diagram of a system for classifying and identifying computer events, according to an embodiment.

In some implementations, a user (e.g., administrator, software end-user, manager, etc.) provides data and/or information associated with a set of computer events. In some implementations, a system collects data automatically from a variety of sources. In some implementations, the computer events are from a variety of systems and enterprises. The computer events can be standardized, and a vector representation can be defined of the standardized data. In some implementations, a locality sensitive (LSH) function is applied on the standardized data. The vector representation can then be transformed by a machine learning model. The transformed data can be sorted, first by a coarse sorting process, then by a fine sorting process, to define a set of distances between data points. The distances can be used to identify anomalous events and/or quarantine an artifact associated with the events. In some implementations, the distances can be utilized to define a set of scores for the events that can be utilized to review the events. In some implementations, the systems and methods described herein categorize events into cohorts based on the distance meeting a criterion of a cohort.

Some techniques described herein allow for a system to reduce the volume of logged data by identifying anomalous events out of a larger set of events. Identifying anomalous events further increases productivity and throughput since a user would review events identified as anomalous instead of a larger set of events. Some techniques described herein increase the fidelity of threat detection by using various methods to identify anomalous events in a variety of methods. Additionally, the system can reduce the time to repair an issue (e.g., threat, problem, etc.) by substantially immediately identifying issues once the data is processed and/or by automatically acting upon an identified anomalous event.

A method includes steps for detecting anomalies and constructing event ontologies from large volumes of heterogeneous event data. The method involves receiving event logs from various sources, standardizing the data, and calculating a representative identifier. This is done by passing the events through tokenization, embedding models (e.g., Word2Vec or BERT), dimensionality reduction techniques (e.g., random projection or locality sensitive hashing), and comparative clustering methods. The similarity (e.g., distances) between the resulting event identifiers are then used to identify anomalies or assign events to cohorts. The method also enables semantic categorization of events into hierarchical ontologies, which can be dynamically expanded. Initial coarse-grained ontologies are constructed using pre-trained language models on event cluster samples. The ontologies are then fit to clusters, evaluating confidence scores to identify gaps. New categories are continually, sporadically and/or periodically added to the ontology when events are encountered with low confidence scores. The abstracted clustered data, scores, and ontology mappings enable privacy-preserving integration with external AI systems for interpretation and quality data sampling. Benefits include detecting anomalies based on uncommon events, context-aware scoring using segmentation, graph enrichment, data reduction, and improved external AI model training. The techniques aim to effectively process massive heterogeneous event datasets to identify relevant patterns and construct evolving hierarchical categorical ontologies. The techniques can also normalize and label data to make both model training and knowledge layer retrieval feasible on security log data.

As used herein, an artifact can be or include, for example, any portable executable file(s), registry key(s), dataset(s), file path(s), Uniform Resource Locator (URL), device(s), device behavior, user behavior, network behavior, network identifier, and/or entity represented and/or associated with computer-related events and/or resources. For further examples, an artifact can include a function of software code, a webpage(s), a data file(s), a model file(s), a source file(s), a script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet a laptop, a multimedia. device, etc.), a network address (e.g., a Media Control (MAC) address, Internet Protocol UP) address, etc.) of a compute device, and/or the like.

FIG. 1 shows a block diagram of a system 10 for classifying and identifying computer events, according to an embodiment. The system 10 is configured to manage and process data from various sources. In some implementations, the system 10 is configured to handle high fidelity event types, such as event types that report computer, user, device, and/or application activities and behaviors. The high-fidelity event types can originate from computer endpoints, applications, devices, and/or cloud instances. The system 10 can include a processing engine 100, a network 120, a user computer device 130, a database 140, source(s) 145, and a computing platform 150.

The network 120 may be used to facilitate communication between the components of the system 10. For example, the network 120 may facilitate operation between the processing engine 100, the user compute device 130, the database 140, the source(s) 145, and/or the event-driven platform 150. The network 120 can be any suitable communications network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted. In some instances, the communication network 120 can include multiple networks or subnetworks operatively coupled to one another by, for example, network bridges, routers, switches, gateways and/or the like (not shown).

The user compute device 130 can be a device configured to control and/or provide signals to the system 10. For example, the user compute device 130 may be used to provide event processing instructions to the processing engine 10. In some implementations, the user compute device 130 may be configured to monitor the operation of the system 10. For example, the user compute device 130 may display progress and/or results of event processing. The user compute device 130 can include a processor 132, memory 134, display 136, and peripheral(s) 138, each operatively coupled to one another (e.g., via a system bus). In some implementations, the user compute device 130 is associated with (e.g., owned by, accessible by, operated by, etc.) a user U1. The user U1 can be any type of user, such as, for example, an administrator, a manager, and/or the like.

The processor 132 of the user compute device 130 can be, for example, a hardware based integrated circuit (IC), or any other suitable processing device configured to run and/or execute a set of instructions or code. For example, the processor 132 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 can be operatively coupled to the memory 134 through a system bus (for example, address bus, data bus and/or control bus).

The memory 134 of the user compute device 130 can be, for example, a random-access memory (RAM), a memory buffer, a hard drive, a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some implementations, the memory 134 can include extendable storage units that can be added and used incrementally. In some implementations, the memory 134 can be a portable memory (e.g., a flash drive, a portable hard disk, and/or the like) that can be operatively coupled to the processor 132. In some instances, the memory 134 can be remotely operatively coupled with a compute device (not shown). For example, a remote database device can serve as a memory and be operatively coupled to the compute device.

The peripheral(s) 138 can include any type of peripheral, such as an input device, an output device, a mouse, keyboard, microphone, touch screen, speaker, scanner, headset, printer, camera, and/or the like. In some instances, the user U1 can use the peripheral(s) 138 to input a command to implement a policy bundle. For example, the user U1 may type the command using a keyboard included in peripheral(s) 138 to indicate the command and/or select the command using a mouse included in peripherals(s) 138 to indicate the command.

The display 136 can be any type of display, such as, for example, a Cathode Ray tube (CRT) display, a Liquid Crystal Display (LCD), a Liquid Emitting Diode (LED) display, an Organic Light Emitting Diode (OLED) display, and/or the like. The display 136 can be used for visually displaying information (e.g., command line, etc.) to user U1. For example, display 136 can display process or the results of a policy bundle implementation.

The database 140 may be used to store data and/or information regarding events from the sources 145 and/or from the user U1 via the user compute device 130. In some implementations, each event includes an associated timestamp and/or data-frame that represents the event. In some implementations, the data can include data fields that is associated with metadata (e.g., usernames, host names, IP addresses, MAC addresses, process descriptions, timestamps, etc.).

The database 140 can be any device or service (e.g., hard-drive, server, cloud storage service, etc.) configured to store signals, information, commands, natural language (NL) descriptions, and/or data. The database 140 may receive and store signals, information and/or data from the other components of the system 10. The database 140 may include a local storage system associated with the policy processing system 10, such as a server, a hard-drive, and/or the like, or a cloud-based storage system. In some implementations, the database 140 may include a combination of local storage systems and cloud-based storage systems.

Additionally, the database 140 can store data and/or information in a distributed cloud, online analytical processing (OLAP) database, and/or similar relational database with ledger entry. In some implementations, the data can be collected and stored in the database 140 by a recording service (e.g., Windows Event Log, SysInternals Sysmon, Endpoint Detection & Response (EDR), etc.). In some implementations, the individual events, portions of events, or groups of events are assigned a unique ID (UID) that serves as an identifier. The UID can include an enterprise/client ID, geographic ID, IP, Operating System, User, and/or other information that can be used as an identifier. The database 140 can receive data from various source types including system data pipe streams, datalakes, data warehouses, other databases, or raw formats. In some implementations, the database 140 receives data and/or information via the network 120. In some implementations, the data can be supplied to the database 140 via a publisher/subscriber protocol. In some implementations, outputs from the processing engine 100 are stored in the database 140 for later access.

In some implementations, the database 140 includes and/or operates as a ledger. For example, the database 140 can include a relational database with ledger entries for events that are performed and/or occur. In some implementations, ledger entries can include a standardized date and/or time of event origin, a UID for the event translated to a one-way hash (e.g., SHA3, SHA256, etc.), a UID for an individual data-frame(s) calculated using a one-way hash, a data origin owner entity and applicable region and industry or group, an incremental count of duplicate occurrences for the individual data-frames, a mapping and incremental count for associated event metadata (e.g., usernames, hostnames, MAC address, process description, etc.), labels for preprocessing and/or post processing rules, assigned cohort labels, aggregate event value score, event topic labels, aggregate event value score, event topic labels, similarity hex-hash, cohort evaluation scores (e.g., aggregate and/or individual), token order, refactoring variance, model version and/or configurations used on input, revised input integer for random projection matrix, various metrics and statistical calculations, revision history, and/or other information associated with the event.

In some implementations, ledger entries can be aggregated to include a single serialized value for each row, which can contain measurable data fields, comparable data fields, and/or data field association mappings. Data field mappings can be identified through association rule mining techniques on a ledger. Data field mappings can be used for improving data mapping lookups and to form the basis of a Graph Database used by a Graph Neural Network (GNN).

The source(s) 145 can provide data and/or information regarding various computer events. The source(s) 145 can be associated with various entities (e.g., company, organization, etc.) and/or users. In some implementations, the source(s) 145 can be systems, compute devices, databases, or the like. In some implementations, the source(s) 145 each store data and/or information in different formats (e.g., storage protocols, storage locations, storage types, file formats, etc.). A subset of the source(s) 145 can be linked (e.g., internally and/or via the network 120) or each of the source(s) 145 can be independent of the others. In some implementations, the source(s) 145 send data associated with events to the database 140 periodically or sporadically. In some implementations, the source(s) 145 send data associated with events to the database 140 based upon a requesting signal.

The computing platform 150 is a computing model that can manage certain processes of the system 10. For example, the computing platform 150 can receive data associated with events from the source(s) 145 and prepare the data for the user U1 so that the user U1 can select certain aspects of the data for processing. In some implementations, the computing platform 150 can be integrally formed with the processing engine 100. In some implementations, the computing platform 150 can complete certain functions of the processing engine 100. The computing platform 150 can include an external server, a cloud computing platform, a serverless computing model, and/or the like.

The processing engine 100 is configured to receive data associated with a set of events and process the data to determine if any of the events of the set of events are anomalous and if so, determine which events are anomalous. The processing engine 100 can include a processor 102 and a memory 104, each operatively coupled to one another (e.g., via a system bus). The memory 104 can include a standardizer 106, a machine learning model 108, a coarse sorter 112, a fine sorter 114, and an identifier 116. In FIG. 1, the coarse sorter 112 and the fine sorter 114 are shown to be included in the machine learning model 108, but, in some embodiments, at least one of the coarse sorter 112 and the fine sorter 114 can be separate from the machine learning model 108. In some implementations, the user compute device 130 is associated with (e.g., owned by, accessible by, operated by, etc.) an organization, and the processing engine 100 is associated with (e.g., owned by, accessible by, operated by, etc.) the same organization. In some implementations, the user compute device 130 is associated with (e.g., owned by, accessible by, operated by, etc.) a first organization, and the processing engine 100 is associated with (e.g., owned by, accessible by, operated by, etc.) a second organization different than the first organization. In some implementations, the processing engine 100 and the user compute device 130 may be components of the same computing system.

The processor 102 of the processing engine 100 can be, for example, a hardware based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor can be operatively coupled to the memory 104 through a system bus (e.g., address bus, data bus, and/or control bus).

The memory 104 of the of the processing engine 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some implementations, the memory 104 can include extendable storage units that can be added and used incrementally. In some implementations, the memory 104 can be a portable memory (e.g., a flash drive, a portable hard disk, and/or the like) that can be operatively coupled to the processor 102. The processor 102 can be configured to execute instructions stored in the memory. The processor 102 can execute the standardizer 106, the machine learning model 108, the coarse sorter 112, the fine sorter 114, and the identifier 116. In some instances, the memory 104 can be remotely operatively coupled with a compute device (not shown). For example, a remote database device can serve as a memory and be operatively coupled to the compute device.

The processing engine 100 can receive instructions and/or data from the user U1. For example, the user U1 can input a set of events (e.g., from the database 140) including data and data-frames associated with the set of events, preview data associated with the set of events, and select data fields for processing via the network 120. For example, the user U1 can input a set of events associated with an organization, the set of events including associated data. The user U1 can then preview the types of data fields associated with the data and can choose a subset of the data fields for processing by the processing engine 100. In some embodiments, the processing engine 100 can receive the set of events from the source(s) 145. For example, the processing engine 100 can automatically pull and/or receive events from the source(s)

145. In some embodiments, the source(s) 145 can send new events and/or sets of events to the processing engine 100. In some implementations, the processing engine 100 receives selections on which data fields to process. In some implementations, the processing engine 100 can automatically determine or identify which data fields to process.

In some implementations, the processing engine 100 can be configured to store a copy (e.g., mirrored binary copy) of the data associated with the set of events to a location (e.g., database 140) associated with a customer. In some implementations, the data can be stored in a format such as Parquet to an object storage container such as Amazon Web Services (AWS) S3. The data can be included in a protocol buffer message stream directly to the object storage container. The data can be catalogued by a catalogue such as Apacahe Iceburg, DeltaLake, and/or the like. Storing copies allows for data to be maintained as a backup efficiently. In some implementations, the stored data can be retrieved through direct application programming interface (API) calls, as described in reference to FIG. 9.

The standardizer 106 is configured to receive the data associated with the set of events and standardize the data for further processing. In some implementations, the standardizer 106 can process the data into a universal format (e.g., Open Cyber Security Framework, etc.). Standardization can facilitate universal recognition of values within the event data. Universal recognition of values can be used for assigning weighted values and for separating non-relevant data from relevant data. For example, event data can include a timestamp with multiple delineated and non-delineated fields, some of which can include data that is not pertinent to a present process. The data that can be identified and standardized can be any type of data that appears in all or a subset of events. For example, data that can be identified and standardized can include file type, date format and syntax, time format and syntax, file location, file origin, etc. In some implementations, the standardizer 106 parses, standardizes, and separates valuable data fields from non-valuable fields. Additionally, in some implementations, the standardizer 106 can identify, parse, and process metadata including artifact categories from multiple operating systems, such as file/process paths, extensions, process, registry, command line arguments, Internet Protocol (IP) address, Domain Name System (DNS) query, etc. Additionally, in some implementations, the standardizer 106 can recognize additional metadata associated actions associated with the event such as a thread, driver loaded, file created, file creation time, file delete, file delete logged, file stream created, image loaded, named pipe connected, named pipe created, network connection detected, clipboard, process accessed, process create, etc.

In some implementations, the standardizer 106 is configured to recognize categories associated with the values in the data based on pattern matching lookup rules. For example, if a field is labeled "Destination," but includes Internet Protocol (IP) addresses, the standardizer 106 can determine that "Destination" referrers to IP Addresses based on the format of the IP addresses in the field. The standardizer 106 can then map the header of a field to a standardized field via lookup tables. The standardizer 106 can include determining the data contents using sampling of a diverse set of examples of log types and manually or automatically labelling the headers to a predetermined standard.

In some implementations, the standardizer 106 uses a large language model to generate a labelled training set instead of manually labelling each field to a predetermined standard. Training set can be used to create and/or define a model. The model can be created and/or defined by developing a set of features extractions using length-based features such as, for example, character count, word count, line count, and/or the like, statistical features such as world length, frequency of special characters, and/or the like, and/or token-based features such as number of tokens, unique token count, and/or the like. In some implementations, the feature extractions can include specialized detectors for common data types, which can include, for example, IP address detectors (e.g., IPv4, IPv6, etc.), file path recognizer (e.g., Windows, Unix-style paths, etc.), timestamp identifiers, Uniform Resource Locator (URL) detectors, and/or the like. The feature extractor can include domain-specific feature extractors such as, for example, user agent string parsers, Hypertext Transfer Protocol (HTTP) status code categorizers, error message pattern recognizers, and/or the like.

In some implementations, the model used by the standardizer 106 can be configured to preprocess the data including special character handling to remove, replace, or encode characters based on context. In some implementations, the model used by the standardizer 106 can be configured to normalize the data based on case such as converting to lowercase, except when case is determined to be meaningful (e.g., by a machine learning model used to identify context). In some implementations, preprocessing can include whitespace standardization to trim excess spaces and/or normalize line breaks. In some implementations, preprocessing can include number and date format standardization and/or abbreviation and acronym expansion. In some implementations, preprocessing can include data cleaning techniques for missing or null values, removing or flagging duplicate entries, and/or correcting misspelling and formatting.

In some implementations, the model used by the standardizer 106 can be one or more random forests, gradient boosting models (e.g., XGBoost, LightGBM, etc.), deep learning models (e.g., long short-term memory, transformer, Bidirectional Encoder Representations from Transformers, etc.), and/or the like. In some implementations, ensemble methods can also be used to combine multiple models. The resulting model is a flexible header mapping function that can be used to input headers and values as arguments to predict header names and implement confidence thresholds for prediction.

In some implementations, the standardizer 106 can preprocess data including cleaning, de-duplicating, filtering based on time, filtering based on origin, and/or the like. In some implementations, the data that is received by the standardizer 106 is already pre-processed. For example, the database 140 can pre-process data that is received by the database 140. The standardizer 106 is configured to standardize the information stored in data fields of the data and standardize the information and implement them in standardized data fields. The standardized data includes data fields that are measurable and comparable. In some implementations, the standardizer 106 generates unique hashes for the events and data-frames. In some implementations, the standardizer 106 can store the unique hashes in a ledger (e.g., such as in the database 140) and any duplicates can be noted and/or removed. The standardized data can be used to define a mapping. In some implementations, the mapping can be identified through associated rule mining techniques. In some implementations, the mapping can be used to form the basis of a Graph Neural Network (GNN).

The machine learning model 108 is configured to process the standardized data received from the standardizer 106.

The machine learning model 108 can be a machine learning based pipeline or an application that leverages machine learning models and techniques. The machine learning model 108 can include the coarse sorter 112 and the fine sorter 114. In some embodiments, at least one of the coarse sorter 112 and the fine sorter 114 are separate from the machine learning model. The machine learning model 108 can accept a selection from a user or can automatically identify which data fields of the standardized data are to be processed. The machine learning model 108 identifies similarities between computer events and can expose patterns that can be used to add context to groups of computer data and/or to individual computer events. Based on the results from the machine learning model 108, predictions can be made on what events are normal and/or anomalous.

The machine learning model 108 can calculate representative identifiers for the events by providing a representation of the standardized event as an input to a predefined function (e.g., hash function, vector function, tokenization function, feature function, etc.). In some implementations, the coarse sorter 112 includes a predefined function that includes tokenization processes. The data fields can be paired with a corresponding tokenization processes by a pre-trained transformer model, a neural network (NN), or by a manually applied configuration script. In some implementations, the tokenization processes include a WordPiece tokenization algorithm.

Once the standardized data is tokenized to define tokenized data, the output tokenization can then be further processed by a word embedding process of the coarse sorter 112. The word embedding process can include, for example, GloVe (Global Vectors for Word Representation), FastText, ELMO (Embeddings from Language Models), BERT (Bidirectional Encoder Representations from Transformers), ULMFIT (Universal Language Model Fine-tuning), Word2Vec, Universal Sentence Encoder, ROBERTa, XLNet, ALBERT and T5. In some implementations, the word embedding process can be chosen (e.g., manually, or automatically) based on the data fields selected and/or identified. The word embedding process can create and/or define a fixed length vector representation.

In some implementations, creating fixed length vector representations can be further refined with additional methods including applying sentence embedding techniques. The fine sorter 114 can include the sentence embedding techniques and/or other techniques used to further process vector representations. The sentence embedding techniques can include, for example, MinHash, SimHash, or other techniques capable of hashing data. In some implementations, multiple types of word embedding processes and/or sentence embedding processes can be used. The machine learning model 108 can then group/cluster the processed data into cohorts. In some embodiments, the fine sorter 114 can group/cluster the processed data into cohorts. Unique cohort labels can be assigned to the processed data by applying a random projection technique to the vector representations and/or a hash, resulting in the processed data being grouped by similarity. In some implementations, the similarity is a measurable output in the form of a similarity hex-hash. In some implementations, the originating event data-frame content can be discarded once the hex-hash is formed since the translation of the data-frame has been made into the hex-hash and the original corresponding unique IDs have been recorded and can be paired later on with the source raw event. Discarding the originating data-frame content can mitigate storage costs and achieve privacy preservation similarity comparisons.

In some implementations, the machine learning model 108 is capable of re-assigning cohorts by sorting similarity hashes based on a random projection. In some implementations, re-assigning cohorts can include an elbow method, classification accuracy, rand index, Fowlkes-Mallows index, adjusted mutual information, normalized mutual information, silhouette score, Davies-Bouldin index, Calinski-Harabasz index, and/or the like. In some implementations, topic labels including short human-readable summaries, are assigned to describe the context of the cohort and the individual events within the cohort. Topic labeling can include named entity recognition, latent semantic indexing, latent Dirichlet allocation (DLA), and/or the like.

In some implementations, the machine learning model 108 computes a fingerprint hash of the event and/or a subset of the event, such as the selected data field. The fingerprint hash allows for anonymizing sensitive information by encoding/encrypting the data while still allowing for comparative functions to take place later on, reducing the storage of the originating data to a compressed and smaller data size, and optimizing and/or improving comparative operations for speed and scalability.

The machine learning model 108 can compute fingerprint hashes that are private and have metrics (e.g., similarity, clusters, etc.) that are not revealing of the underlying event data. The machine learning model 108 can include fingerprinting comparative algorithms and clustering techniques such as, for example, ball tree, closest pair of points problem, cluster analysis, content-based image retrieval, curse of dimensionality, digital signal processing, dimension reduction, fixed-radius near neighbors, Fourier analysis, instance-based learning, k-nearest neighbor algorithm, Linear least squares, LSH, MinHash, multidimensional analysis, nearest-neighbor interpolation, neighbor joining, principal component analysis, range search, similarity learning, singular value decomposition, sparse distributed memory, statistical distance, time series, Voronoi diagram, Wavelet, Lempel-Ziv Jaccard distance, bloom filter, SimHash, w-shingling, count-min sketch, concept mining, N-gram, k-mer, rolling hash, rabin fingerprint, vector space model, bag-of-words model, deep pairwise-supervised hashing, Facebook AI similarity search (Faiss), Winnowing and RareChunk, symmetrical covariance matrix, and/or the like.

In some implementations, the machine learning process 108 can include a fingerprinting process using a SimHash function calculated on the selected data-fields. By pre-parsing out the selected data-fields, the SimHash fingerprint uses fewer computing resources. Results of hashing functions can be stored in hash tables grouped by metadata. In some implementations, a similarity (e.g., distance) of each subevent to others is calculated and recorded. The similarity is a metric for comparing two binary data strings. While comparing two binary strings of equal length, the similarity (e.g., distance) is the number of bit positions in which the two bits are different. In some implementations, one or many clustering techniques such as K-means or agglomerative clustering techniques are used to cluster by the similarity (e.g., distance) set to a prescribed outer and inner limit. In some implementations, clustering can be randomly chosen by any initiating hash pair with similarities calculated resulting in formed cohorts. In some implementations, as the size of the fingerprint database grows, the scalability and the clustering processing become limiting factors. A distribution process can be applied to aid in scalability. Additionally, a pseudorandom hash function or other cryptographic based hash can be applied to further prevent theoretical reversal and reveal of the fingerprinted data.

The machine learning model 108 can additionally further incorporate auxiliary enrichment of the cohorts and events and the resulting implied event value scores. Using the same method and process applied to the data-frames at the time of ingestion, a manually supplied event can be input as a hash-rule/search criteria and tagged with a human readable label (e.g., "malicious," "benign," etc.). The input can be updated to the ledger or can be used as a search to return the cohorts and the corresponding events.

Additional enrichments can be received from various sources (e.g., Threat Intelligence Feeds for indicators of compromise). The additional enrichments can be applied without writing a pattern matching rule logic. The rule can be a sub-label for a cohort and any responsive criteria is automatically clustered to and/or assigned an associated label name. In some implementations, enrichment can include labelling ontologies and/or clusters with interesting, normal, and/or anomalous labels. In some implementations, a large language model is used to generate a summary of why the label was assigned to provide further context. In some implementations, nearest neighboring clusters can be determined and overlapping metadata such as user, devices, rules, etc. can be highlighted.

In some embodiments, assignments to cohorts can be manually overridden. Manual overriding is useful in scenarios where a cohort does not contain accurate groupings of events and a manual correction is helpful. In some embodiments, the data-frame hex-hash can be compared to a random sampling within the cohort lists and the cosine similarities can be calculated. The data-frame is then assigned to the next closest cohort that also shares similar topic labeling. In some implementations, an additional error checking process can be trained on manual submission for future re-enforcement model training.

In some embodiments, an internal process for self-correction of faulty cohort assignments can involve statistical sampling of events and applying a submission process with precision techniques. For example, the ledger is checked for the blended evaluation results and any manual weight assignments. Events that are in the lower scored threshold are then flagged for re-assignment. In some implantations, the correction process can include refactoring the data-frames so that the tokenized data is randomly re-ordered and refactored, updating the ledger so that the order of the tokenized data or refactoring is recorded, applying the new array of tokenized data into the non-transformer word embedding model, then sentence embeddings, and random projection, re-applying the evaluation criteria, and/or the like. If the evaluation results move to an acceptable level, the new cohort can be recorded with the hex-hash values. In some implementations, the acceptable level can be based on an individual score and/or an aggregate score being above a predetermined threshold or can be based on a manual review of the result. If the evaluation results are not in the acceptable range, then the data-frame can be re-processed using the pre-trained transformer model for token assignment. In some implementations, if the results do not meet an acceptable evaluation range, random projection matrix values can be adjusted to be proportionally higher if the cohort is sparse and proportionally lower if the cohort is dense. If the results still do not meet an acceptable evaluation range, then they are flagged for cohort re-assignment and re-distributed using topic labels similarity. In some implementations, if a large set of cohorts reach unacceptable evaluation scores, then the models are re-trained to account for the variances and adjustments made of the cohorts.

The identifier 116 is configured to receive processed data from the machine learning model 108 and review the processed data to determine if an event is anomalous. The identifier can provide iterative comparison of the computer events, components of the events, groups of events, and/or subevents. In some implementations, a relationship between the incorporation of time-series and UID metadata is applied. The output will produce a closeness metric (e.g., score) that can be used to determine how common (e.g., similar to other events) or prevalent an event is. In some embodiments, comparing events can be based on a period of time, distinction of the computer users, computer group or organizational ownership, industry or intended activity, functionality, geographical location, and/or other classifications.

The scores can be translated to a single normalized scale (e.g., 0-100). The scores can be a metric that can be used to determine how valuable events are for present and/or future scenarios. Value can be associated with common or uncommon events, which can either have or not have a use in current or future scenarios. An uncommon event is one that has no similar events and is not part of a cohort or has been disassociated with a cohort when paired with a meta-data item such as a user or host that contains the sole event. An event can be considered common if it is assigned to the highest density percentile cohorts, additionally if the event is paired to meta-data and it still maintains a high percentile of similar events, it is likely a common event. Metrics for determining common and uncommon data and/or events can be updated as additional information is introduced. Such metrics may also be updated in batch form at set intervals or when variances in the data become too great computationally.

Scoring produces a database of fingerprints of computer events, sub-events, and individual artifacts/actions and an iterative comparison metric that is indicative of commonality of events. In some embodiments, the identifier 116 can identify outlier events that can be indicative of non-common events. In some embodiments, the fingerprint is secured from attempts to reveal the underlying event by the use of a pseudorandom or other cryptographic hash applied to the fingerprint.

The identifier 116 can also make use of a traditional query processing engine for pattern matching of data fields in the filtering pre-process stage. The identifier 116 can use multiple standard query or rule standards such as SQL, YAML, or YARA allowing for Boolean, Regex and/or other pattern matching to be achieved on the event data. Results from querying can be used for additional enrichment of an event and/or to provide supplemental weighting to the cohort assignment process. For example, if a known IOC (indicator of compromise) is identified by a rule, the known IOC can be tagged as such and properly identified as such within the cohort.

Additionally, the identifier 116 can allow for event relationships to be derived and viewed from the ledger. For example, relationships that can be derived and viewed from the ledger include the occurrence of identical or similar events across sensitive environments without divulging the event content, the occurrence of identical, or similar events broken up by any shared metadata field, a listing of the events grouped into cohorts that contain similar data in their event data-frame(s), the density of the cohort for a give event(s), the density calculated by the total events in the cohort, the count of exact events, similar events, and the corresponding proportional frequency to other cohort statistics in the population, a listing of events that are not similar to any other events (e.g., outliers), events that are least similar within a cohort, events that are least similar within a cohort and a shared metadata field, events that share similar topic labels, average time distance for the events within a cohort, and/or the like. In some implementations, relationships can be auto generated by the use of a graph machine learning technique (e.g., a GNN).

In some implementations, the memory 104 can include instructions related to ontology. Initial ontology creation can occur once events have been clustered. The contents of events can be used as an additional input to a function that determines a semantic category name for each cluster. These names may not be standardized and as such a subroutine can further aggregate the categories and pass them through to a large language model (LLM) to determine a cohesive ontology structure with n levels. This process can be used to initially form the ontology of events. Using LLMs can include semantic category naming, which may use an LLM that has been pre-trained on similar data. A sampling can be taken from an adequate size group of clusters and the sample can be of each cluster proportional to the unique items contained within a portion. An LLM can be used to generate the first pass of category names that semantically capture the raw data-frames of each cluster sample. Once this list of names is generated for available cluster samples of sufficient size, they can then be fed back into the same pre-trained LLM to construct the ontology hierarchy. The prompt can be designed to ask the model to generate a category-based ontology for the given input categories that were previously generated. For example, the input to the LLM might be, "Given the following category list: [representative text], suggest a suitable ontology that is at least 3 levels deep and is not overlapping or redundant". The LLM can generate an ontology listing that captures the semantic meaning of the events in the clusters. This final output ontology listing can be reviewed and manually revised to make sure it accurately captures the potential categories, and each ontology is not overlapping or redundant. An example ontology can be: Application-->Web Browser-->Chrome, Firefox, Safari, IE, Edge, Other. As another example: Application-->Media Player-->Windows Media Player, VLC, iTunes, Other.

In some implementations, the previously built ontology list can be paired with the desired corresponding clusters. The same LLM can also be used to fit the preconstructed ontology list to each cluster by inputting both the ontology list and the cluster samples. The prompt may be set to loop. The ontology fitting is then evaluated. The fitting process may be able to judge the confidence level for the pairing the ontology to the cluster samples. This may be, for example, a score of 0-1. If a confidence score is less than the mean average score of the confidence scores then the confidence score can imply that either the ontology is not sufficiently complete or the sample was not adequate, or there simply is not enough variable input tokens in the data set. In this scenario the ontology is flagged for review.

In some implementations, ontology may be created. Should new events that were not part of the initial training set contain low confidence scores (e.g., a confidence score below a threshold) they can automatically be sent to the ontology pipeline creation/addition process. This can constitute a self-adjusting ontology. The workflow can receive batches at a set interval. The sampling of data-frames with low confidence scores that have not been previously examined can be sent back through the LLM asking the LLM to build a list of categories as performed initially. This new category list and the ontology list is then passed to the same LLM via a prompt. This prompt may be, for example: "Given the existing ontology [existing ontology list] and new categories [new category list] from recently observed low-confidence data, suggest possible integrations and modifications to the ontology structure to accommodate these new categories. Please provide your reasoning for each suggestion."

After an event(s) is clustered, the cluster and the event can be mapped to a curated ontology list. One of the purposes for mapping the cluster to ontology is to provide a simple method of organization while enriching the context of the content of the cluster. Mapping a cluster to an ontology can be used for inflicting another dimension to adjust the cluster score at a contextual level, determine anomalies, enrich a graph network, data reduction or group filter, external integration to an LLM, and/or the like.

Inflicting another dimension to adjust the cluster score at a contextual level can be similar to contextual scoring, described herein. The same population partitioning can occur based on the ontology at various levels. For example, grouping clusters that fit into a matched ontology category(s) can change the total population and as such adjust the input variables for the scoring calculation. This can identify and/or show outliers or normal events represented in the cluster and the associated score as the event fits within the grouping of the ontology category.

Determining anomalies can be done by using an ontology coupled with contextual scoring mentioned above. High scoring clusters can be identified and grouped by category. An example would be to filter on "Executable-->Windows EXE-->exe" and then sort by matching clusters with score of 100. This can identify events where an executable may potentially be malicious.

Additionally, metrics captured for events being mapped to certain ontologies can explain trends and signal anomalies or trends when paired with additional metadata such as users or devices. For example, if a particular user suddenly starts generating more events into a particular cluster that is associated with specific categories, the system can infer that a change occurred. This alert can be custom tuned to create watchers that simply determine when new anomalous trends are occurring at any level or grouping.

As well and as part of the initial dynamic ontology creation, if new categories are being created suddenly, that could signal new emerging trends not previously seen before. To further this capability and turn this capability into an anomaly detection capability, the ontology creation threshold based on the confidence score can be set to a high threshold so as to automatically begin to generate more ontologies. These highly aggressive new ontology creations may exist to further define trends and thus detect anomalies at the user or device level. A sub workflow within the dynamic ontology creation can be set to high precision.

Enriching a graph network can be done as ontologies are particularly valuable in inferring semantic meaning through their category association. This can be further illustrated when constructing and viewing a knowledge graph. During the construction of the graph the schema can leverage the nodes usually representing entities, and the edges representing relationships between these entities. Therefore, in an ontology, categories can be represented by nodes, and the relations between these categories (like "is a subclass of", "is a part of", etc.) can be represented by edges.

For data reduction or group filtering with the use of the ontology creation, further signal to noise reduction can be achieved by grouping the ontologies by category. By grouping the clusters in categorical form, the most applicable clusters can be shown. For example, in the scenario where we want events that are clustered and contain the category of "security>malware>other" a user may perform this grouping and thus see events that have a semantic association to the category and not other events.

External integration to an LLM can include LLM privacy preservation. The processes described herein can also be used for privacy preserving capabilities of the underlying data before being provided to external Large Language Models (e.g., ChatGPT). In some implementations, this can be accomplished because the clustered data is masked and denoted by a HexHash, statistics, a score, and/or an ontology mapping. In some implementations, the abstracted output (the cluster size, frequency, score, ontology and/or any metadata such as timestamps) is sent to an AI model for interpretation and not other data. This can allow for an AI model to make predictions that otherwise could not be determined without such an integration.

External integration to an LLM can also include LLM data quality. Another beneficial approach as it relates to integration with an external AI model is that, by using the clustering and scoring process, the underlying data has been reduced to similar buckets. In one example of roughly 30 billion events, the data was clustered to produce 20 k distinct clusters, of which 99.97% represented common events. A sampling of each cluster and its corresponding score is sent instead of sending every iteration of data that is likely similar. The data set is therefore likely to be of higher quality than without these processes. This can reduce costs, time and improve the training 31 ccuracyy.

Figure 2:
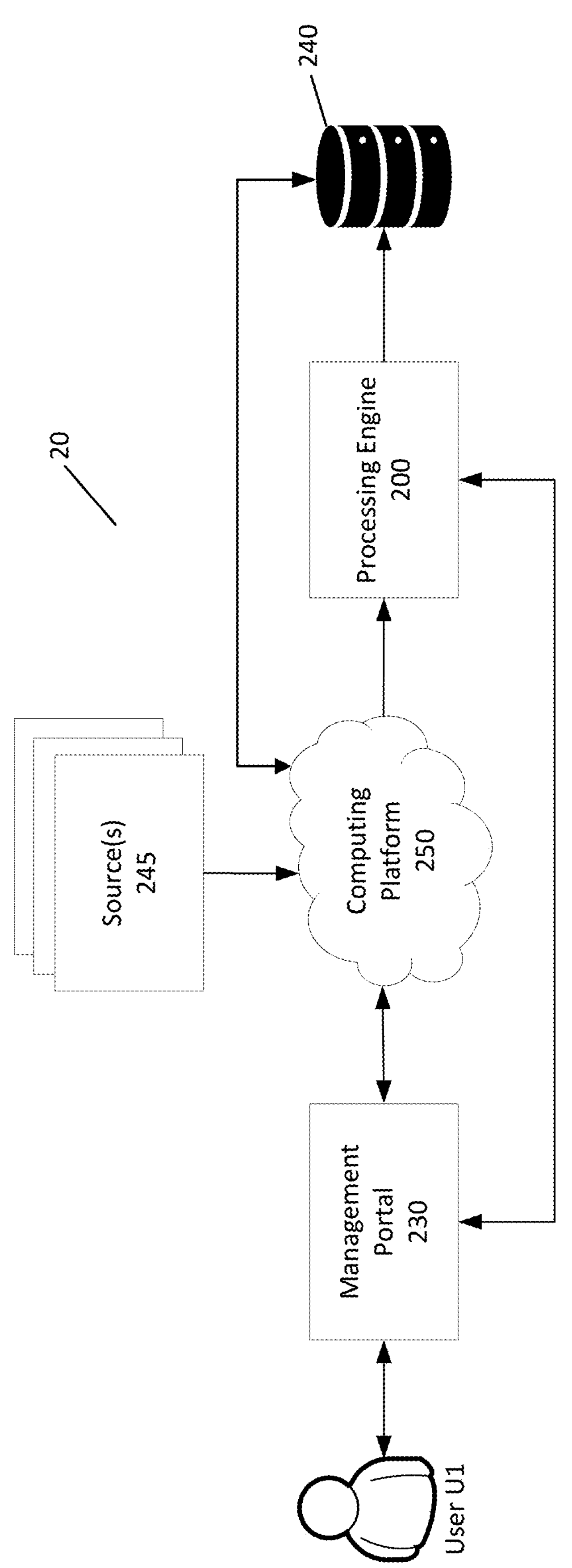
FIG. 2 shows a block diagram of a processing environment for processing computer events, according to an embodiment.

FIG. 2 shows a block diagram of a processing environment 20 for processing computer events, according to an embodiment. In some implementations, the processing environment 20 is structurally and/or functionally similar to the system 100 of FIG. 1. The processing environment 20 can be used to identify anomalous events. The processing environment 20 includes a management portal 230 (e.g., functionally and/or structurally similar to at least a portion of the user compute device 130 of FIG. 1), a computing platform 250 (e.g., functionally and/or structurally similar to the computing platform 150 of FIG. 1), source(s) 245 (e.g., functionally and/or structurally similar to the sources 145 of FIG. 1), a processing engine 200 (e.g., functionally and/or structurally similar to the processing engine 100 of FIG. 1), and a database 240 (e.g., functionally and/or structurally similar to the database 140 of FIG. 1). A user U1 can interact with the processing environment 20 via a management portal 230.

The processing environment 20 is configured to prepare security data for external model (e.g., artificial intelligence) creation and consumption. For example, the processing environment 20 is configured to create cohorts based on the events, as further described in reference to FIG. 5. The processing environment 20 is configured to assign labels to each event and cohort based on characteristics and the ontology created by the system (e.g., data labeling). The processing environment 20 then assigns scores and weights based on frequency, uniqueness, and potential security relevance (e.g., weighting). The processing environment 20 then forms a knowledge layer that can be used to train models. The knowledge layer's data can be updated and/or pulled using a retrieval method. The knowledge layer can allow for a model to output event data, standardized event logs, parsed event fields, structured event fields, timestamps, source information, event descriptions, metadata, cohort scores, cohort assignments, ontology classifications, relationship information such as links between related events and temporal sequences, and/or the like.

In some implementations, the processing environment 20 is a Software-as-a-Service (SaaS) environment. In a SaaS environment, a user can create an account on a web portal via the management portal 230 and can be presented with instructions on how to process event data. The results of the process can then be used by the user U1 to make data driven decisions, uncover insights that can be useful for a business, industry, and/or research purpose. In a SaaS environment, application programming interfaces (APIs) can be used to allow for access to data for analysis or review via the account and/or to retrieve events from a user's systems and/or databases.

The user U1 can be an administrator, manager, security professional, or other user of the processing environment 20. The user interacts with the management portal 230, which can be a user computer device configured to manage data processing in the processing environment 20. The user U1 can input computer event sets into the management portal 230 or can direct computer event data from the source(s) 245 and/or from the database 240. The management portal 230 can present information to the user U1 in a user-understandable format such as a no-code user-interface/user-experience. In some implementations, the management portal 230 presents the user U1 with a web-based connection tool to select and connect to the input data source(s) and also to define the credentials to be used. Data transformation options can also be presented to the user U1. The user U1 can preview the inputted data schemas and various transformation options (such as merging, renaming, removing, or converting data fields). The user U1 can also select one or more destination paths to which the data should be sent. The user U1 can make selections corresponding to a desired outcome. For example, the management portal 230 can accept the user U1's selections for which data-frames from the event sources should be enriched. Enrichment can include an assignment of a data-frame to a cohort score, an output of an engine, such as engine 100, and/or the like. In some implementations, a component of the processing environment 20 can automatically identify data-frames for enrichment based on a predetermined list of exact and similar column names.

In some implementations, the management portal 230 can be used to display a dashboard to the user U1. The dashboard can include information received from the processing engine 200 and/or other components of the processing environment 20. The dashboard can include information such as a system management page, insights into the data, cohorts, data mappings, data relationships, a searching feature, and/or a connection tool. In some embodiments, the processing environment 20 includes an API that can establish connections, enrich data, and/or process data and result searches. The API can be used to lookup each data-frame submitted to the computing platform 250. Resulting entries can be returned as event enrichment. Using an API can be useful if a publicly available event submission website is used or if implemented as a plugin to a vendor.

The computing platform 250 can receive input from the user U1 via management portal 230, database 240, and/or the sources 245. The computing platform 250 can include multiple data ingestion types such as a local upload, Elastic, Kafka, publisher/subscriber, etc. The computing platform 250 can generate a data and/or data field preview that can be sent back to the management portal 230 for review by the user U1. The computing platform 250 can also present data fields for processing to the management portal 230 so that the user U1 can make a selection. In some implementations, the computing platform 250 can perform data preparation steps. The data preparation steps can include, for example, data deduplication of the selected fields, standardizing fields, relabeling fields, filtering data, removing data, converting data, etc.

The processing engine 200 can receive the prepared data from the computing platform 250. The processing engine 200 processes the selected data fields including applying labels, clustering into cohorts, and/or other methods described in reference to the processing engine 100 of FIG. 1. The processing engine 200 can additionally generate scores for the computer events based on the processed data fields as well as map the computer events and record relationships between computer events. The processing engine 200 can additionally consume and/or generate analytics based on processing the computer events. The output of the processing engine 200 can be sent to the management portal 230 for review by the user and/or can be sent to the database 240 for storage and/or for future access.

Figure 3:
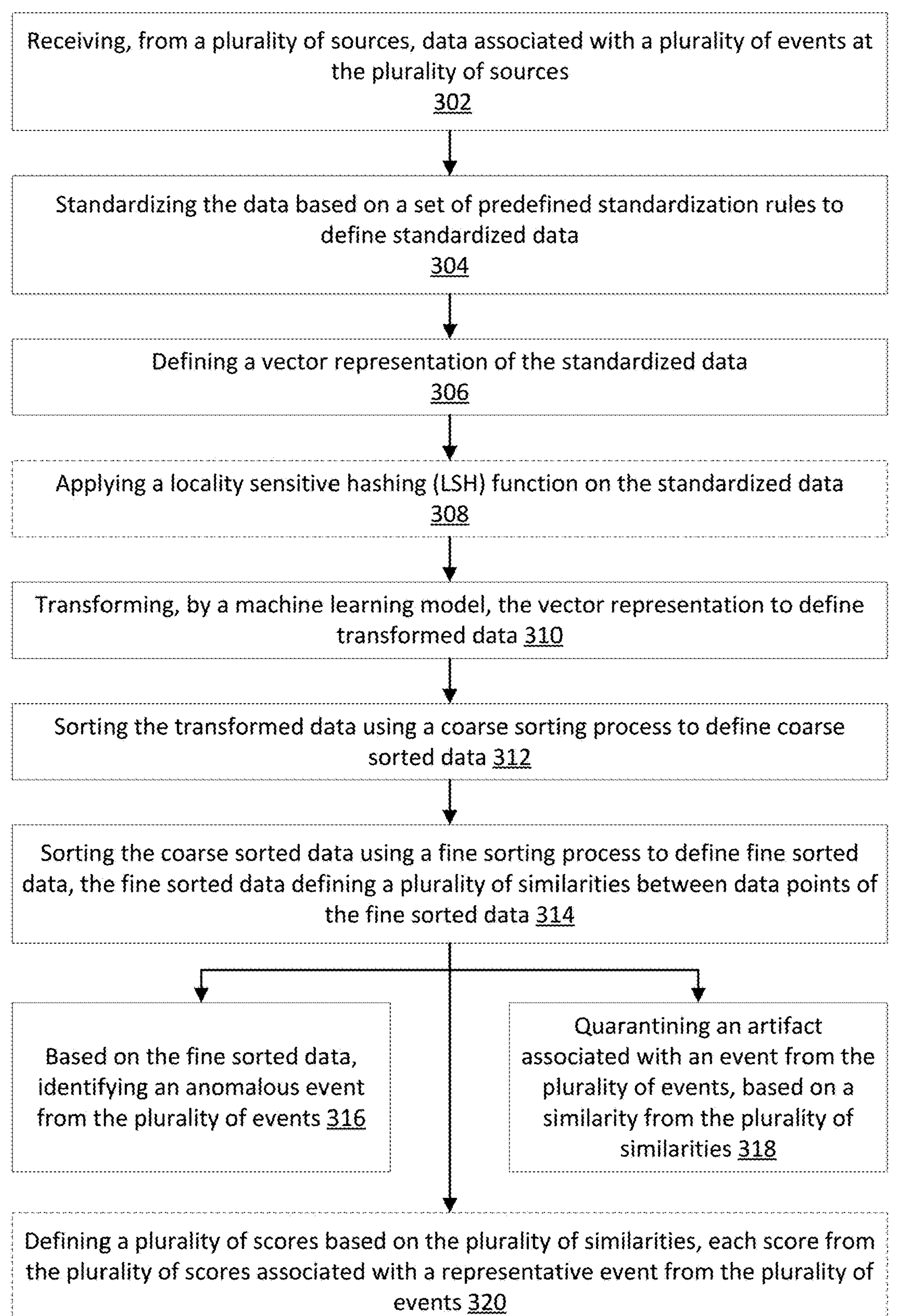
FIG. 3 shows a flowchart of a method for processing computer events, according to an embodiment.

FIG. 3 shows a flowchart of a method 300 for processing computer events, according to an embodiment. The method 300 can be executed by a system, such as the system 10 of FIG. 1. The method 300 includes receiving, from a plurality of sources, data associated with a plurality of events at the plurality of sources, at 302; standardizing the data based on a set of predefined standardization rules to define standardized data, at 304; defining a vector representation of the standardized data, at 306; optionally applying a locality sensitive hashing (LSH) function on the standardized data, at 308; transforming, by a machine learning model, the vector representation to define transformed data, at 310; sorting the transformed data using a coarse sorting process to define coarse sorted data, at 312; sorting the coarse sorted data using a fine sorting process to define fine sorted data, the fine sorted data defining a plurality of similarities (e.g., distances) between data points of the fine sorted data, at 314; based on the fine sorted data, identifying an anomalous event from the plurality of events, at 316; quarantining an artifact associated with an event from the plurality of events, based on a similarity from the plurality of similarities, at 318; and optionally defining a plurality of scores based on the plurality of similarities, each score from the plurality of scores associated with a representative event from the plurality of events, at 320.

At 302, the method 300 includes receiving, from a plurality of sources (e.g., functionally and/or structurally similar to the sources 145 of FIG. 1), data associated with a plurality of events at the plurality of sources. In some implementations, the data includes timestamps and data frames. In some implementations, the data includes structured or unstructured event logs associated with the plurality of sources. In some implementations, the events are part of a system generated log that contains data and at least one data field. In some implementations, the data can be part of a stream source such as Kafka, PubSub, Kinesis, and/or a similar source. In some implementations, the data can be received from a database or as a raw file (e.g., JSON, CSV, etc.). In some implementations, a processing engine (e.g., structurally and/or functionally similar to the processing engine 100 of FIG. 1) executes step 302. The data can include a data-frame, metadata, and/or similar information. In some implementations, the data can be received from a database (e.g., structurally and/or functionally similar to the database 140 of FIG. 1) storing the data. In some implementations, the processing engine sends as pull request for the data from a database (e.g., functionally and/or structurally similar to the database 140 of FIG. 1). In some implementations, the processing engine receives the data via a network (e.g., structurally and/or functionally similar to the network 120 of FIG. 1) or directly, such as via a flash drive, compact disk (CD), hard drive transfer, and/or the like.

At 304, the method 300 includes standardizing the data based on a set of predefined standardization rules to define standardized data. In some implementations, a standardizer (e.g., structurally and/or functionally similar to the standardizer 106 of FIG. 1) executes 304. Defining a standardized event can include parsing the data and standardizing the data fields in the data-frame to a common format. In some implementations, the common format can be predetermined or can be based off the inputted event data. Standardizing can be based on a set of predefined standardization rules which can be determined and/or inputted. In some implementations, certain data fields, such as those that are predefined and/or determined as desired to be standardized, are standardized and other data fields are not standardized. In some implementations, the predefined data fields are then mapped on an event map. The event map includes mappings of various events of the plurality of events.

At 306, the method 300 includes defining a vector representation of the standardized data. In some implementations, a machine learning model (e.g., functionally and/or structurally similar to the machine learning model 108 of FIG. 1) executes 306. The vector representation can be a representation of the standardized data from 304 and is of a predetermined length. Defining a vector representation can include applying a word embedding process, such as word2vec or the like.

At 308, the method 300 optionally includes applying an LSH function on the standardized data. In some implementations, the machine learning model executes step 308. Step 308 can be used when using transformers to reduce the size of the dataset being provided to the transformer. In some implementations, such as when a transformer is not used, 308 can be optional.

At 310, the method 300 includes transforming, by a machine learning model, the vector representation to define transformed data. The machine learning model can be a transformer, in some implementations. The transformer can allow for more parallelization than other machine learning models. In some implementations, the machine learning model includes a neural network, reinforcement learning, a Bayesian network, a random forest, a support vector machine and/or a decision tree. The transformed data is prepared for sorting and categorizing by a coarse sorter (e.g., structurally and/or functionally similar to the coarse sorter 112 of FIG. 1) and a fine sorter (e.g., structurally and/or functionally similar to the fine sorter 114 of FIG. 1).

At 312, the method 300 includes sorting the transformed data using a coarse sorting process to define coarse sorted data. In some implementations, the coarse sorter executes the coarse sorting process. The coarse sorted data can include clustered data. In some implementations, the coarse sorting processing includes using an LSH function. Using an LSH can enhance the clustering process. In some implementations, the coarse sorting process can include using a WordPiece tokenization algorithm.

At 314, the method 300 includes sorting the coarse sorted data using a fine sorting process to define fine sorted data, the fine sorted data defining a plurality of similarities (e.g., distances) between data points of the fine sorted data. In some implementations, the fine sorter executes step 314. In some implementations, the fine sorting process can include using at least one of a cosine similarity, a hamming distance, dot product similarity, a Euclidean distance, or a nearest neighbor search to define the plurality of similarities. The plurality of similarities are associated with and/or represent the measured differences between the data points of the fine sorted data.

At 316, the method 300 includes identifying an anomalous event from the plurality of events based on the fine sorted data. In some implementations, an identifier (e.g., structurally and/or functionally similar to the identifier 116 of FIG. 1) executes step 316. In some implementations, identifying the anomalous event is based on at least one of the similarities from the plurality of similarities not meeting a predetermined criterion (e.g., a distance exceeding a predetermined threshold). The predetermined criterion can be associated with a predefined similarity level, where similarities (e.g., distances) not meeting the predetermined criterion are considered anomalous as they are not similar enough to the other events. In some implementations, the method 300 can include identifying a set of uncommon events based on the plurality of similarities for each event from the set of uncommon events not meeting a criterion. In some implementations, the criterion is associated with an event cohort. For example, when events are clustered into cohorts based on similarity, those that are not sufficiently similar to the cohort (e.g., distance is below the predetermined threshold) are classified as anomalous. In some implementations, identifying the set of uncommon events is based on metadata as associated with each event from the set of uncommon events. For example, the metadata of the uncommon events can differ from the metadata of events not identified as uncommon. Specifically, if events have a timestamp in common, events with different time stamps can be identified as uncommon. In some embodiments, the method 300 can include additionally taking remedial action based on identifying anomalous events. The remedial action can include at least one of identifying the anomalous event as indicative of malware, quarantining a file associated with the anomalous event, or restricting access to a device associated with the anomalous event. In some implementations, a similarity criterion and/or distance threshold can be manually set. In some implementations, the similarity criterion and/or distance threshold is determined based on input data population size. For example, a smaller data set may have a lower threshold as false positives may be easier to manage.

At 318, the method 300 includes quarantining an artifact associated with an event from the plurality of events based on a similarity from the plurality of similarities (e.g., based on the distance threshold). The artifact can be associated with a portion or portions of the event (e.g., metadata, data-field entry, etc.) that may be dissimilar from other events, causing the event to be anomalous. Quarantining can include locking the artifact so that the artifact cannot be sent, received, opened, etc., thus protecting other events from potentially malicious data. In some implementations, an anomalous event can first be determined based on the similarity not meeting a predetermined criterion (e.g., the distance exceeding a predetermined threshold), such as in 316. Once the anomalous event is identified, the specific artifact or artifacts that are responsible for the event to be identified as anomalous can be identified and then quarantined. Quarantined artifacts can be reviewed and analyzed to determine if they are a credible threat or a false positive.

At 320, the method 300 optionally includes defining a plurality of scores based on the plurality of similarities. In some implementations, each score from the plurality of scores is associated with a respective event from the plurality of events. In some implementations, a score from the plurality of scores can be associated with a similarity from the plurality of similarities and between a first event and a second event, where both the first event and the second event are in the same cohort. In some implementations, a score from the plurality of scores can be associated with a similarity between a first event and a second event, where the first event and the second event are in different cohorts. The scores can be reviewed, either manually by a user or automatically by the system, to determine if action should be taken. For example, if there are scores that indicate that anomalous events are present, a user or system can determine action to remedy any issues that can be associated with the anomalous events.

FIG. 4 shows a flowchart of a method 400 for identifying an anomalous event, according to an embodiment. The method 400 can be executed by a processing engine, such as the processing engine 100 of FIG. 1. The method 400 includes receiving, from a plurality of sources, data associated with an event at the source, the data including an event timestamp and an event data-frame, at 402; defining a standardized event based on the event by parsing the data to map predefined data fields within the event data-frame based on predefined standardization rules, at 404; calculating a representative identifier for the event by providing a representation of the standardized event as an input to a predefined function, at 406; defining an identifier for the event based on the representative identifier, at 408; calculating a similarity (e.g., distance) of the identifier to an identifier associated with each event cohort from a plurality of event cohorts, at 410; assigning the event to an event cohort from the plurality of event cohorts based on the similarity meeting a criterion of that cohort, at 412; optionally identifying a set of uncommon events based on a similarity associated with a representative identifier of each event from the set of uncommon events not meeting a criterion of an event cohort form the plurality of event cohorts, at 414; and identifying an anomalous event based on the similarity not meeting a predefined criterion (e.g., a distance exceeding a predetermined threshold), at 416. The method 400 is in reference to a single event of a set of events, but, in some implementations, can be applied to a larger set of event data.

At 402, the method 400 includes receiving, from a plurality of sources (e.g., functionally and/or structurally similar to the source(s) 145 of FIG. 1), data associated with an event at the source, the data including an event timestamp and an event data-frame. The data-frame can include metadata associated with each event and/or other information associated with the event. In some implementations, the data is received by a processing engine (e.g., functionally and/or structurally similar to the processing engine 100 of FIG. 1). In some implementations, the processing engine sends as pull request for the data from a database (e.g., functionally and/or structurally similar to the database 140 of FIG. 1). In some implementations, the processing engine receives the data via a network (e.g., structurally and/or functionally similar to the network 120 of FIG. 1) or directly, such as via a flash drive, CD, hard drive transfer, and/or the like.

At 404, the method 400 includes defining a standardized event based on the event by parsing the data to map predefined data fields within the event data-frame based on predefined standardization rules. In some implementations, a standardizer (e.g., structurally and/or functionally similar to the standardizer 106 of FIG. 1) executes step 404. Defining a standardized event can include parsing the data and standardizing the data fields in the data-frame to a common format. In some implementations, the common format can be predetermined or can be based off the inputted event data. Standardizing can be based on a set of predefined standardization rules, which can be automatically determined and/or inputted by a user. In some implementation, certain data fields, such as those that are predefined and/or determined as desired to be standardized, are standardized and other data fields are not standardized.

In some implementations, data enters through an extract transform load (ETL) pipeline, which connects various sources and processes the sources as one or many pipelines, increasing efficiency. As part of the pipelines, the inputted data can be parsed for precise clustering or can be used in whole. In some embodiments, preparing the data for clustering includes identifying the data-frame to be clustered. For example, preparing the data can include filtering so that the delimiter or structure of the data is modified, then the data is clustered. As another example, preparing the data can include a series of filters that identify the data rich portion of an event log that is desired for clustering, which may include using a lookup table or matching index for common field terms (e.g., commandline, registryKey, UserAgent, etc.). The matched fields and/or derivatives can be clustered.

As another example, preparing the data can include using natural language processing (NLP) model(s) and transformer(s) to automatically identify the type of data for alignment to a list of known and/or predetermined data types (e.g., field names, column names, etc.). In some implementations, the model(s) (e.g., NLP and/or transformers) can be trained used a data repository of structured data where the structured fields have column names and conform to a common scheme (e.g., CIM, OCSF, UDM, etc.). The column names can be associated with values by a training process that determines mapping between the embeddings using logical regression. Training the NLP model(s) can include a tokenization process including cleaning data values in a given column names and removing noise (e.g., whitespace, case normalization, non-UTF-8, punctuation, etc.). In some embodiments, tokenization can include stemming and lemmatization and filtering stopwords, numbers, and account for word lengths. Tokenization can, in some implementations, retain mapping values to associated column names.

In some embodiments, training the models can include creating embedding models using a transformer approach such as bidirectional encoder representations from transformers and an NLP model such as Word2Vec, Glove, and/or ELMO. The outputs of the transformer approach and the NLP model can be combined into a single stacked embedding to create a weighted average of the embeddings (input values). In some implementations, combining may use a library such as, for example, numpy.hstack. In some implementations, training the models can further use a logical regression to train using the weighted average of the embeddings while maintaining the association to the column name. The logical regression can adjust parameters so that there is an improved and/or optimized or reduced and/or minimized difference between the weighted averages. In some implementations a confidence score may be utilized to identify an anomaly, such as when data drift occurs, or when new data is encountered that doesn't perfectly fit with the pre-trained column names. When the confidence score is below an average (or other threshold), a sub-training process may commence to learn the new data and its associated column name.

In some embodiments, identifying the data to be clustered can include predicting column names using a trained prediction model. Training the trained prediction model can be similar to training the NLP model, as discussed above. To predict a column name, stacked embeddings can be inputted into the trained prediction model to determine a predicted column name or data type. The predicted column name or data type can be used to determine how data is clustered. Specifically, each data type may have a different tokenization step, or may use a different tokenization model.

In some implementations, an approach using a pre-trained LLM can be used to determine from a sampling of the input data stream which fields best correspond to a data-frame mapping list. Known data types (e.g., windows commandline, linux commandline, url, useragent string, etc.) can be used and a prompt can take the list of known data types and generate a response that may be used to determine which component of the input data maps to which known schema field identifier (e.g., Common Information Model (CIM), Unified Data Model (UDM), Open Cyber Security Framework (OCSF), etc.).

The predefined data fields are then mapped on an event map. The event map including mappings of various events of a set of events associated with the event.

At 406, the method 400 includes calculating a representative identifier for the event by providing a representation of the standardized event as an input to a predefined function. In some implementations, a machine learning model (e.g., structurally and/or functionally similar to the machine learning model 108 of FIG. 1) can execute step 406. In some implementations, the predefined function includes at least one of a hash function, a vector function, and/or a feature function.

In some implementations, the predefined function can include unique ID assignment, tokenization, embedding, dimensionality reduction/hashing, comparative/clustering processes, and/or additional enrichment. Unique ID assignment occurs once the dataframe has been mapped to a category. The dataframe is initially passed through a sortable hash routine such as MurmurHash or similar sorting hash. The purpose of passing through a sortable hash routine is to determine if a particular dataframe has already been processed and, if so, to what cohort the particular dataframe has been assigned. If a dataframe has been identified before the associated metadata, a counter is recorded into a database. For tokenization, if the dataframe has not been identified before based on the hash lookup the dataframe enters an engine routine. This routine can determine the best tokenization approach (e.g., wordpiece such as BERT or a custom approach) based on the dataframe type and predetermined routines that are suited for each dataframe type. For example, some dataframes or data types can be pre-processed differently to ensure the embeddings are calculated correctly. This pre-processing or tokenization completes and then an embedding or vectorization approach is used. For embedding, depending on the data type, any one or more embedding techniques can be used. The one or more embedding techniques can be pre-determined based on the final cluster evaluation results for a given data type. For example, word embedding techniques can include Word2Vec, RNN-LSTM, Wordpiece, pre-trained transformer LLM, or Hashing Vectorizer. RNN-LSTM word embedding such as ELMO can be used in conjunction with a transformer (e.g., BERT) can be used to leverage the stacking approach where the weighted average of the embeddings are used for the given input dataframe. ELMO or Word2Vec NLP embedding can be used independently. A modified version of Word2Vec can also be used. Word2Vec can be modified so that it does not randomly seed the vectors by time or other randomness after the first word embedding that is generated. Instead Word2Vec can be configured to pass the previous vector of the preceding word as the seed resulting repeating words receiving the same vector. This allows association of identical parts of a sentence by having the same vector.

Wordpiece embedding such as BERT can be used as a transformer approach to word embedding. Pre-trained LLM models can include either a custom trained LLM or an off the shelf LLM such as OpenAIs many embedding models. Hashing Vectorization can be used to create a sparse matrix representation of the token counts using hashing. The hashing part of this is used to map the tokens to an index in the feature space.

The comparative/clustering process can occur after the embeddings are calculated. Based on the different types of data frames and embeddings generated, one or more of the following comparative or clustering processes can be used. For example, SimHash or other LSH methods are used to estimate the similarity of the tokens from the embeddings. This is done in the case of SimHash by first creating a hash value of the values embeddings calculated previously or in some cases prior embedding generation can be skipped. The initial hash function can convert the embeddings or tokens into a binary representation (as 1s or 0s). This first hash function transforms the original data into a fixed-size binary hash fingerprint. Next this binary hash fingerprint can be combined using bitwise operations to create a single binary fingerprint of the data. This combination ensures that the fingerprint represents the features of the data. Next a similarity search is conducted by using buckets and/or the calculated similarities (e.g., Hamming distances). This is done by partitioning the fingerprints into buckets and then efficiently searching for similar fingerprints within the same bucket based on their similarity (e.g., Hamming distance), thus becoming clusters. The resulting vector hash is then converted into a hexadecimal hash to maintain a unique identifier of the cluster or group and recorded into a database. When using an NLP word embedding such as Word2Vec, output vectors into MinHash can be used to create a vector representation of the original data-frame. This step can be used to concatenate the Word2Vec vectors from a 2D space into a 1D representation.

Random projection can include transforming high-dimensional data into a lower-dimensional space in a way that approximately preserves the relative distances between the data points. Random projection starts by generating a set of random vectors, for example 512, in the original high dimensional space (for example, 1000 dimensions). These vectors are what become the random hyperplanes for the projection. The high dimensional data embeddings are then projected onto these random vectors, creating a reduced dimensionality representation of each data point. In this reduced space, data points that were close together in the original high-dimensional space tend to remain close together. The similarity relationships between the data points are preserved approximately. As a result, two items from the original embeddings that are similar (e.g., close together in the high-dimensional space), will likely be similar in the reduced dimensionality space after random projection. This proximity can be tested using similarity (e.g., distance) metrics appropriate for the lower-dimensional space. However, this step can be used to validate the process and this computationally intensive step may not be used. A unique identifier for each data point in the lower-dimensional space can be created as part of a hexadecimal hash. These vectors can be transformed into a hexadecimal hash value. Identical or very similar hash values thus indicate items that were in close proximity in the reduced space. This process allows for efficient similarity analysis of the original high-dimensional data. By comparing the hash values, items from the original embeddings that are similar to each other can be identified without having to compute the similarity (e.g., distance) between every pair of high-dimensional vectors. Moreover, the reduced-dimensional space can also be divided into sections (buckets) based on these hash values for efficient nearest neighbor search operations.

In some implementations, a HexHash is the final step that is recorded in comparative or clustering scenarios. The integer hash values can be turned into hexadecimal strings using the hex function. This can be done using a vectorize function, which applies the hex function to the elements of an array. The result is an array of hexadecimal hash values, where each hexadecimal hash value corresponds to one embedding. Generally, the embedded hash method is converting high-dimensional embeddings into compact hexadecimal hash values by projecting the embeddings into a lower-dimensional space using random vectors, binarizing the projections, interpreting the binarized projections as integers, and then converting the integers into hexadecimal strings.

In some implementations, calculating the representative identifier includes a tokenization process such as a WordPiece tokenizer. The tokenization process can include tokenizing the standardized event to produce a tokenized event. The tokenized event can then be provided to a word embedding model to define a vector representation of the event. The vector representation acts as a representation of the standardized event from step 404 and is of a predetermined length. In some implementations, the representative identifier identifies what type of function the predefined function is. For example, the representative identifier can be a hash identifier that identifies the predefined function as a hash function.

At 408, the method 400 includes defining an identifier for the event based on the representative identifier. In some implementations, the machine learning model executes step 408. In some implementations, defining the identifier is based on at least one of a recurrent neural network (RNN) or a transformer. The representative identifier can represent the event anonymously and/or in a format that uses fewer computational resources for further processing. Step 408 may include generating a unique hexadecimal hash from a binary vector or hash representation of clusters. The hash can be used to calculate the distance between clusters using, for example, cosine similarity.

At 410, the method 400 includes calculating a similarity (e.g., distance) of the identifier to an identifier associated with each event cohort from a plurality of event cohorts. In some implementations, the machine learning model executes step 410. In some implementations, calculating the similarity is based on at least one of a cosine similarity, a hamming distance, a nearest neighbor search, a dot product similarity, or a Euclidean distance. In some implementations, calculating the similarity is based on LSH. The similarity can be associated with the relative differences between the identifier, and thus the event, and the identifier associated with each event cohort, and thus the event cohort. In some implementations, random projection can be used. When using random projection, no distance is calculated, however cosine similarity is inferred during dimensionality reduction as the vector space becomes condensed until matching hashes or lack thereof are formed. This creates buckets of similar items.

When random projection is used for clustering, additional calculations are not used for determining cluster components because dimensionality reduction shrinks the dimensions while maintaining the embedding closeness, thus the items within each bucket can be considered clustered. To compare two items or more, cosine similarity can be used from the resulting HexHash as discussed herein.

In some implementations, SimHash can be used to calculate the similarity (e.g., distance). The distance between two event identifiers can be calculated using Hamming distance. This measures the number of differing bits between the 256-bit binary event identifier vectors. Closer events have a low Hamming distance as their identifier vectors are more similar. Additionally, similarity can be inferred based on grouping similar hashes together. The closer they are the more similar the items will be.

When using SimHash, distance calculations may not be used. Instead, similar hashes are grouped together into buckets, and then times within the same bucket are compared (e.g., via hamming distance).

In some implementations, this step may be optional. Calculating similarities may be desired in some embodiments. For example, by generating a similarity matrix, the population of items and the degree of similarity can be determined. This may be computationally expensive and may be done for small batches or when a cluster is to be evaluated for accuracy. For example, with SimHash or similar LSH algorithms, the hamming distance can be calculated for items within a cluster and then where an item is not with a 98% similarity range the item may be removed from the cluster group and set to be re-clustered. As another example, a cosine similarity can be calculated for two clusters to determine the similarity of their group total of contents. In some instances, cosine similarity can be calculated using the produced HexHash.

At 412, the method 400 includes assigning the event to an event cohort from the plurality of event cohorts based on the similarity meeting a criterion of that cohort. In some implementations, the machine learning model and/or an identifier (e.g., structurally and/or functionally similar to the identifier 116 of FIG. 1) executes step 412. In some implementations, the criterion is associated with the similarity meeting a criterion (e.g., a distance being below a predetermined threshold). The similarity meeting a criterion can indicate that there is a sufficient similarity between an event and an event cohort to assign the event to that cohort. In some implementations, events are optionally assigned to a cohort if their median Hamming distance to existing cohort members is within a predetermined similarity percentage. The cosine, or hamming distances are used a way to quantify that the groupings performed by LSH actions are accurate. In some implementations, if the similarity meets the criterion (e.g., distance is below the predetermined threshold) for multiple event cohorts, the event can be assigned to the event cohort associated with the closest similarity (e.g., the shortest distance). In some implementations, if the similarity meets the criterion (e.g., distance is below the predetermined threshold) for multiple event cohorts, the event can be assigned to multiple event cohorts (or the closest event cohort from the multiple event cohorts). In some implementations, such as when the similarity does not meet a criterion (e.g., distance does not meet a criterion) of any cohort, the event can be left unassigned.

At 414, the method 400 optionally includes identifying a set of uncommon events based on a similarity associated with a representative identifier of each event from the set of uncommon events not meeting a criterion of an event cohort from the plurality of event cohorts. In some implementations, the identifier executes step 414. In some implementations, the criterion can correspond to a distance threshold. For example, uncommon events can be the events whose similarity does not meet a criterion (e.g., distance exceed a predetermined distance threshold), indicating that an anomalous difference may be present. In some implementations, identifying the set of uncommon events is based on metadata associated with each event of the set of uncommon events. For example, identifying can be based on the file type not being consistent with the filetype of other events. In some implementations, even if an event is assigned to a cohort, the metadata can lead to an event being determined as uncommon. For example, certain artifacts of metadata can be identified as anomalous in conjunction with certain cohorts. For example, certain file origins, such as those from known malicious actors, can be flagged as anomalous when they appear in certain cohorts. This additional review allows for known issues to be highlighted and tagged for further review.

At 416, the method 400 includes identifying an anomalous event based on the similarity not meeting a predetermined criterion. In some implementations, the identifier executes step 416. Anomalous events can correspond to those that do not belong to any cohort. For example, an event can be identified as anomalous if the similarity calculated in 410 does not meet the criterion of an event cohort. In some implementations, an anomalous event can be identified if the similarity between the identifier of the event and the identifier of each event within the cohort does not meet a criterion. For example, the event can be assigned to a cohort, but the event can then be identified as anomalous if the event is determined to be too dissimilar to the other events within the cohort (e.g., based on metadata).

At 416, original data frames that are clustered as described above can exist as being part of a cluster or as a true outlier (e.g., not part of a cluster containing>1 data frames). The true outlier can be measured by the count of itself and is the most dissimilar or furthest in any one direction from the mean of the cluster densities. However, if there is a proportionally large number of outliers the score can be closer to the mean. The other clusters however can be measured in a way that scores how far a cluster's density is in relation to the mean cluster population density. Measurements of the cluster components are calculated both globally and contextually by segmentation. This information (e.g., the cluster, log, and the associated metadata) is stored in a database.

Global cluster scoring can include scoring each unique attribute based on the logarithmic distribution and quantity of associated entities. Global cluster scoring emphasizes diversity (e.g., number of distinct entities) over volume (e.g., total count). The score S(i) for each attribute can be calculated as:

$$S(i) = \log(N(i)) * D(i)$$

Where N (i) is the total count of instances for attribute i and D(i) is the number of distinct entities for attribute i. Additional adjustments (such as z-scoring, gaussian smoothing, entropy, etc.) might be applied on S(i) depending on the specific needs and characteristics of the dataset.

Contextual cluster scoring can be used, in some embodiments. Contextual cluster scoring takes into account the context or segmentation of the population. For instance, if clusters are linked to certain groups, users, devices, applications, categories, or time frames, these contexts can be taken into consideration when scoring the clusters. This can be useful because the segmentation of the population can influence the distribution and frequencies of the attributes within each segment. For example, with determining the score of a specific named computer device, clusters that are related to a specific system can be factored into the score, while other clusters are not factored into the score, which measures frequency and density in relation to the segmented population (in this case, the specific system). This approach gives a more context-aware score to each cluster. The score S(i,j) for each attribute i within each segment j can be calculated:

$$S(i, j) = \left(F(i, j)/F_{Total}(j)\right) * \left(D(i, j)/D_{Total}(j)\right)$$

Where F(i, j): the frequency of attribute i in segment j, $F_{Total}(j)$ is the total frequency of attributes in segment j, D(i,j) is the diversity (number of distinct entities) of attributes i in segment j, and $D_{Total}(j)$ is the total diversity (total distinct entities) in segment j. In some implementations, additional adjustments (like z-scoring, gaussian smoothing, entropy, etc.) can be applied on S(i, j).

In some implementations, scores can be from 0 to 100, where 0 refers to a cluster or the cluster's content(s) being the most common and where a score of 100 means the cluster or the cluster's content(s) are the least common. Context can be applied to shift the scores based on the scope of the population to provide a more precise score.

Metadata can be used as a population partition. Additionally, other metadata elements can accompany an event that can be used as an additional weighting element. Such an example would include a malware detection, or security alert in its metadata. In scenarios including malware detection, the cluster can be weighted heavier. This can be a manual process that adds predetermined weight to the score or can be automated to be part of the inline rule or filtering process. In another scenario an element of an event that would imply the element is common or generally not of interest can be used to underweight the score closer to 0. After 416 is completed, the method 400 can repeat for other events, or multiple instance of the method 400 can operate in parallel.

Figure 5:
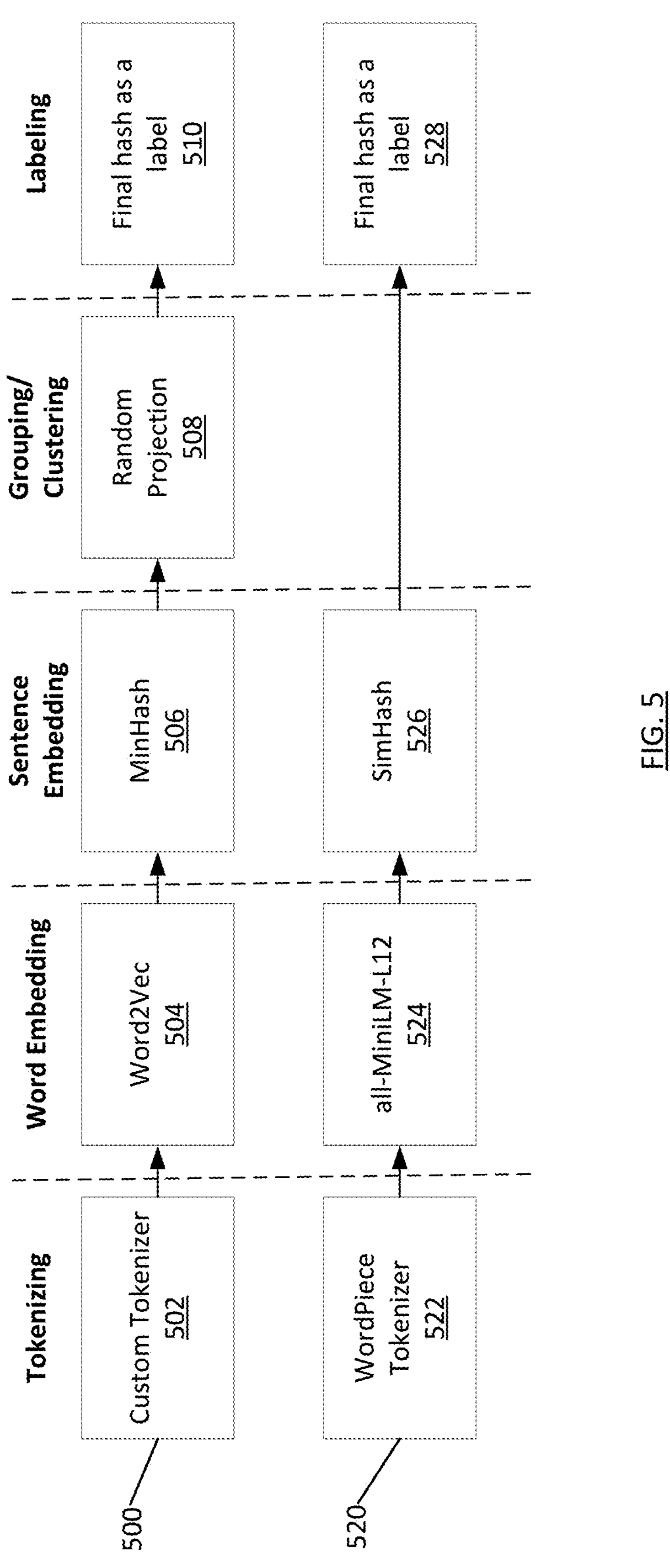
FIG. 5 shows a flowchart of methods for event processing, according to an embodiment.

FIG. 5 shows a flowchart of example methods (500, 520) for processing data, according to an embodiment. The methods (500, 520) can be executed by a system, such as system 10, or by a component of the system 10, such as the machine learning model 108. The methods (500, 520) can receive standardized data and process the standardized data to categorize and sort the standardized data into cohorts.

The first method 500 includes tokenizing using a custom tokenizer, at 502, word embedding using Word2Vec, at 504, sentence embedding using MinHash, at 506, grouping/clustering using random projection, at 508, and labeling by using a final hash as a label, at 510. At 502, a custom tokenizer receives the standardized data and tokenizes the data. The custom tokenizer can be a tokenizer that is trained using manually inputted tokenization data. The custom tokenizer can be trained using historical data and/or simulated data. In some implementations, the custom tokenizer can include a combination of other tokenizers as desired by the system.

In some implementations, tokenizing can include adaptive tokenization such as, for example, whitespace-based tokenization for general text, regex-based tokenization for structured data (e.g., log entries), path-specific tokenization for file system paths, command lines, URLs, and/or the like, and custom tokenizers for domain-specific formats (e.g., user agent strings, HTTP headers), and/or the like. In some implementation, tokenization can include sub word tokenization for handling unknown or compound words. In some implementations, token normalization (e.g., stemming, lemmatization, etc.) is used.

At 504, the tokenized data is processed by a word2vec technique, which uses a neural network for word embedding to generate vector representations of the data. Word2vec weighs the tokenized data statically based on surrounding strings. At 506, the vector is processed by a MinHash technique (e.g., min-wise independent permutations locality sensitive hashing scheme) to determine similarity within the vector. The similarity can be associated with how similar selected data fields of events are, or how similar the events are as a whole. The similarity data can then be used, at 508, to group/cluster using a random projection technique. Random projection allows for the events to be categorized into cohorts while reducing dimensionality and simplifying the data. Random projection can be used because random projection preserves distances between events.

In some embodiments, grouping/clustering can be used to reduce data without filtering by score and/or signal type (e.g., normal, abnormal, etc.). For example, grouping/clustering can be done by aggregating by a cohort ID, as seen in FIG. 9. Aggregating allows for events to be arranged as a summary. As seen in FIG. 9, the cohort IDs can be selected to show individual events. In some embodiments, a user can select events to receive data associated with the event from a database (e.g., lakehouse, data lake, data warehouse, etc.) storing the data. At 510, the events arranged into cohorts are hashed to label the events and/or the cohorts. In some embodiments, the events and/or clusters arranged in cohorts can be fitted to an ontology. The ontology is a structured framework that categorizes and defines relationships among different concepts within a domain. For example, an ontology for cybersecurity can organize security events into categories such as user actions, network activities, etc. and can establish how these categories relate to each other.

Fitting to an ontology can include generating a vector space using vector embedding using the data. The vector embeddings are generated by a machine learning model trained on the expected data. The vector embeddings for the data can be inserted into a vector space, which can be used to identify which ontology or cohort within an ontology an event may belong to based on existing events and ontologies. In some implementations, vector spaces can be built using dense vector search and sparse vector search. Dense vector search can include searching based on meaning using transformer embedding models and sparse vector search can include searching based on text and generating vectors based on specific terms and then calculating similarity based on term overlap.

Dense vector search and sparse vector search can be combined into a hybrid vector space to balance semantic and term-based matches. The dense vectors and sparse vectors are merged into a hybrid vector space so that similar objects can be identified based on similarities in the hybrid vector space. The hybrid vector space is described further in reference to FIG. 11. After forming the hybrid vector space, prelabelled events can be assigned to the hybrid vector space. When a new event is passed through the hybrid vector space, the most similar ontology labels are returned. From the most similar ontology labels, a final label is produced based on a mean, max or sum aggregation. The final label can then be output to a database and/or used to assign an event to a cohort.

The second method 520 includes tokenizing using a WordPiece Tokenizer, at 520, word embedding using all- MiniLM-L12, at 524, sentence embedding using SimHash, at 526, and labeling by using a final hash as a label, at 528.

At 522, the standardized data is tokenized by a WordPiece tokenizer. In some implementations, another subword based tokenization method can be used. At 524, all-MiniLM-L12, a transformer, is used as a word embedding process. all-MiniLM-L12 maps the tokenized data from 522 to a vector space. The transformer allows for weights of tokens to be dynamically adjusted using an additional layer that captures the weight of the tokens in relation to surrounding tokens for a present sequence and for further sequences, thus allowing for unseen tokens to be predicted. The results of the transformer can be used for clustering processes. At 526, a SimHash technique is applied to the transformed data to determine similarity between events. SimHash allows for similarity determinations to be processed quickly. At 528, the events arranged into cohorts are hashed to label the events and/or the cohorts.

Figure 6:
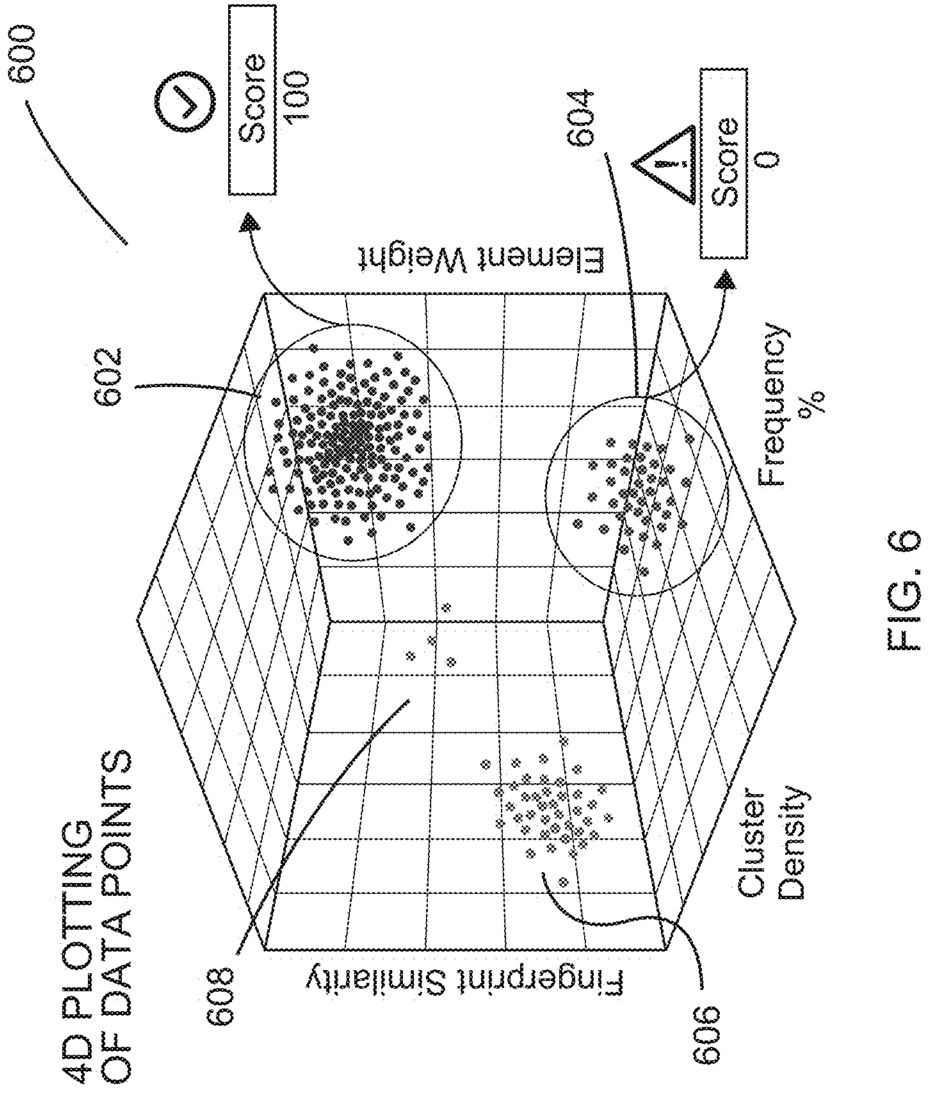
FIG. 6 shows a data point distribution, according to an embodiment.

FIG. 6 shows a data point distribution 600, according to an embodiment. The data point distribution 600 can be a visualization of the output of a system, such as system 10 of FIG. 1. For example, a processing engine (e.g., functionally and/or structurally similar to the processing engine 100 of FIG. 1) can process set(s) of computer events and organize the computer events into cohorts. A score can then be determined for the cohorts and/or the computer events within the cohorts. The data point distribution 600 can be, for example, the output of the method 300 of FIG. 3. The data point distribution 600 includes a first cohort 602, a second cohort 604, a third cohort 606, and a fourth cohort 608. Each of the cohorts (602, 604, 606, 608) are groups of events that have been identified as having enough similarity to be assigned to the same cohort. The events in the data point distribution 600 are mapped based on cluster density, frequency, element weight, and/or fingerprint similarity. Each of the cohorts (602, 604, 606, 608) is assigned a score. The score of certain cohorts of the cohorts (602, 604, 606, 608) can indicate malicious events, while other cohorts can indicate that no malicious events are identified. The score can correspond to an internal score, where the score corresponds to an average score for the events within the cohort or can correspond to a score for the cohort in relation to the other cohorts. The first cohort 602 has a higher score than the second cohort 604, which can indicate that the cohort 602 has higher similarity of events (e.g., no outliers). In some implementations, scores below a predetermined threshold can result in a warning being generated for that cohort, as seen in the second cohort 604.

Figure 7:
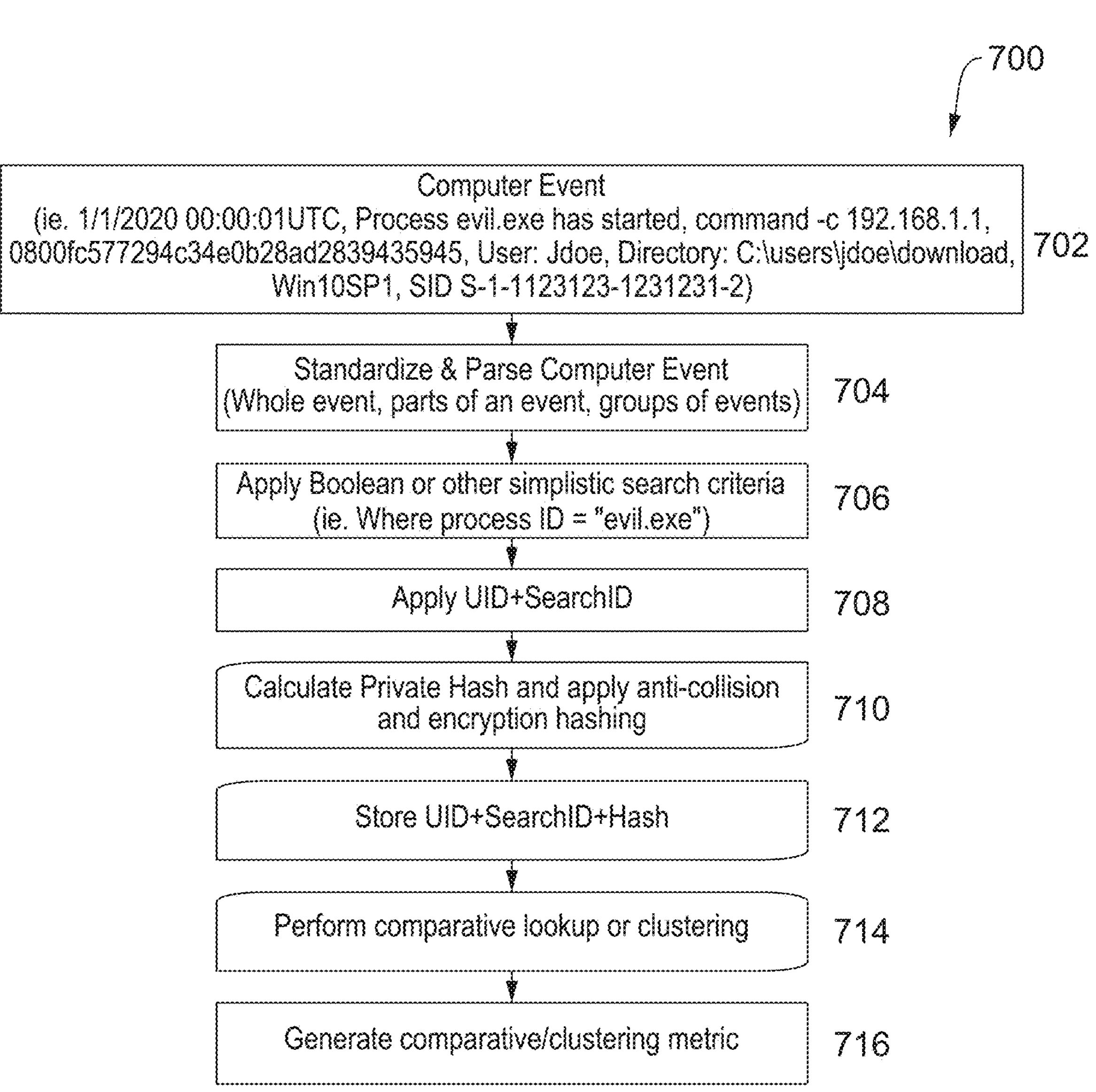
FIG. 7 shows a flow diagram depicting an example process for identifying commonality in computer events, according to an embodiment.

FIG. 7 shows a flow diagram depicting an example method 700 for identifying commonality in computer events, according to an example embodiment. The method 700 begins with 702, wherein the system detects that one or more computer events may be generated and collected. Next, the method 700 continues to 704, wherein the system may standardize and/or parse the collected computer events. In some implementations, 704 may be performed on the whole computer event data, parts of a computer event data, or groups of computer event data. At 704, the method 700 may facilitate universal recognition of values within computer event data that are pertinent in assigning weighted values and separating non relevant data. Next, the method 700 continues to 706, wherein the system applies search criteria to the standardized data. Examples of search criteria may include Boolean or other open-source threat intelligence platforms and languages.

Next, the method 700 may proceed to 708, wherein the system may apply unique ID (UID) and/or search ID to individual event data, portions of event data, or groups of event data. Step 708 may facilitate a "tie back" to the source data, i.e., the source data can be easily identified by the UID and search ID. Next, the method 700 may proceed to operation 710, wherein the system calculates a private hash value and/or applies anti-collision and encryption hashing. In some implementations, a custom algorithm or series of algorithms can be used to compute/calculate a fingerprint hash of the computer event(s), sub-event, or pre-determined event artifact and/or artifact actions in 710. In some implementations, the custom algorithm or the series of algorithms can include, for example, ball tree, closest pair of points problem, cluster analysis, content-based image retrieval, curse of dimensionality, digital signal processing, dimension reduction, fixed-radius near neighbors, Fourier analysis, instance-based learning, k-nearest neighbor algorithm, Linear least squares, LSH, MinHash, multidimensional analysis, nearest-neighbor interpolation, neighbor joining, principal component analysis, range search, similarity learning, singular value decomposition, sparse distributed memory, statistical distance, time series, Voronoi diagram, Wavelet, Lempel-Ziv Jaccard distance, bloom filter, SimHash, w-shingling, count-min sketch, concept mining, N-gram, k-mer, rolling hash, rabin fingerprint, vector space model, bag-of-words model, deep pairwise-supervised hashing, Facebook AI similarity search (Faiss), Winnowing and RareChunk, symmetrical covariance matrix, etc. This may serve the purpose of (1) anonymizing sensitive information by encoding/encrypting the data while still allowing for comparative functions to take place later on; (2) reducing the storage of the originating data to a compressed and smaller data size; (3) optimizing and/or improving comparative operations for speed and scalability; and/or (4) creating fingerprints that are both private and having metrics (similarity/clusters) that are not revealing of the underlying event data (without possessing originals). Examples of the fingerprinting comparative algorithms and clustering techniques can include: Ball tree, Closest pair of points problem, Cluster analysis, Contentbased image retrieval, Curse of dimensionality, Digital signal processing, Dimension reduction, Fixed-radius near neighbors, Fourier analysis, Instance-based learning, k-nearest neighbor algorithm, Linear least squares, Locality sensitive hashing, MinHash, Multidimensional analysis, Nearest neighbor interpolation, Neighbor joining, Principal component analysis, Range search, Similarity learning, Singular value decomposition, Sparse distributed memory, Statistical distance, Time series, Voronoi diagram, Wavelet, Lempel-Ziv Jaccard Distance, Bloom filter, SimHash, w-shingling, Count-min sketch, Concept mining, N-gram, k-mer, Rolling hash, Rabin fingerprint, Vector space model, Bag-of-words model, deep pairwise-supervised hashing, Facebook AI Similarity Search (Faiss), Winnowing and RareChunk, symmetrical covariance matrix, and the like.

Next, the method 700 continues to 712, wherein the system stores UID, search ID, and/or comparative hash value to a data store. In some implementations, the UID, search ID, and/or comparative hash value are stitched together to generate a universal ID for the underlying computer event. Next, the method 700 continues to 714, wherein the system may perform comparative lookup or clustering. The method 714 may compare the universal ID, UID, search ID, and/or comparative hash value to a common event metric that is generated from previous computer events. Outlier events can be identified quickly when using one or more of the universal ID, UID, search ID, and/or comparative hash value and investigation may be scheduled based on the amount of deviation from the common event metric. Next, the method 700 proceeds to 716, wherein the system generates a comparative/clustering metric. In some implementations, the non-outlier events may be further stored to the common event metric.

Figure 8:
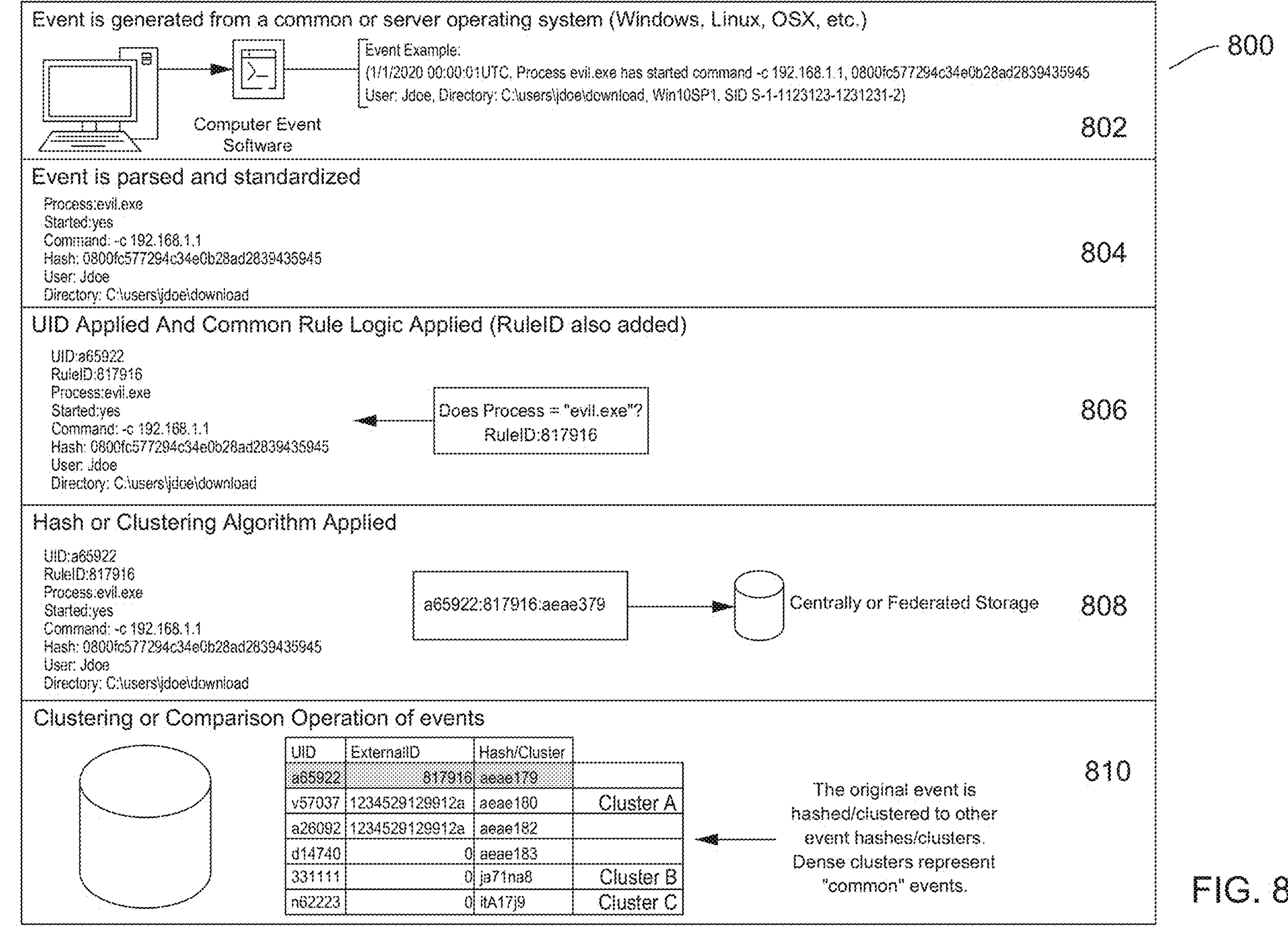
FIG. 8 shows a flow diagram depicting an example process for identifying commonality in computer events, according to an embodiment.

FIG. 8 shows a flow diagram depicting a method 800 for identifying commonality in computer events, according to an example embodiment. As depicted in FIG. 8, once the platforms and systems of the present disclosure are initialized, the method 800 begins with 802, wherein the system detects that one or more computer events may be generated and collected. Next, the method 800 continues to 804, wherein the system may standardize and/or parse the collected computer events. In some implementations, this operation 804 may be performed on the whole computer event data, parts of a computer event data, or groups of computer event data. Step 804 may facilitate universal recognition of values within computer event data is pertinent in assigning weighted values and separating non relevant data later on.

Next, the method 800 continues to 806, wherein the system applies UID and common rule logic to the events, for example, to individual event data, portions of event data, or groups of event data. Step 806 may facilitate a "tie back" to the source data, i.e., the source data can be easily identified by the UID and search ID. Next, the method 800 may proceed to 808, wherein the system may apply hash function of a clustering algorithm to the computer events. In some implementations, a custom algorithm or series of algorithms can be used to compute/calculate a fingerprint hash value of the computer event(s), sub-event, or pre-determined event artifact and/or artifact actions in operation 808. This may serve the purpose of (1) anonymizing sensitive information by encoding/encrypting the data while still allowing for comparative functions to take place later on; (2) reducing the storage of the originating data to a compressed and smaller data size; (3) optimizing and/or improving comparative operations for speed and scalability; and/or (4) creating and/or defining fingerprints that are both private and its metrics (similarity/clusters) are not revealing of the underlying event data (without possessing originals). Next, the method 800 may proceed to operation 810, wherein the system may perform clustering or comparison of the computer events. Step 810 may compare the universal ID, UID, search ID, and/or comparative hash to a common event metric that is generated from previous computer events. Outlier events can be identified quickly when using one or more of the universal ID, UID, search ID, and/or comparative hash and necessary investigation may be scheduled based on the amount of deviation from the common event metric.

Figure 10:
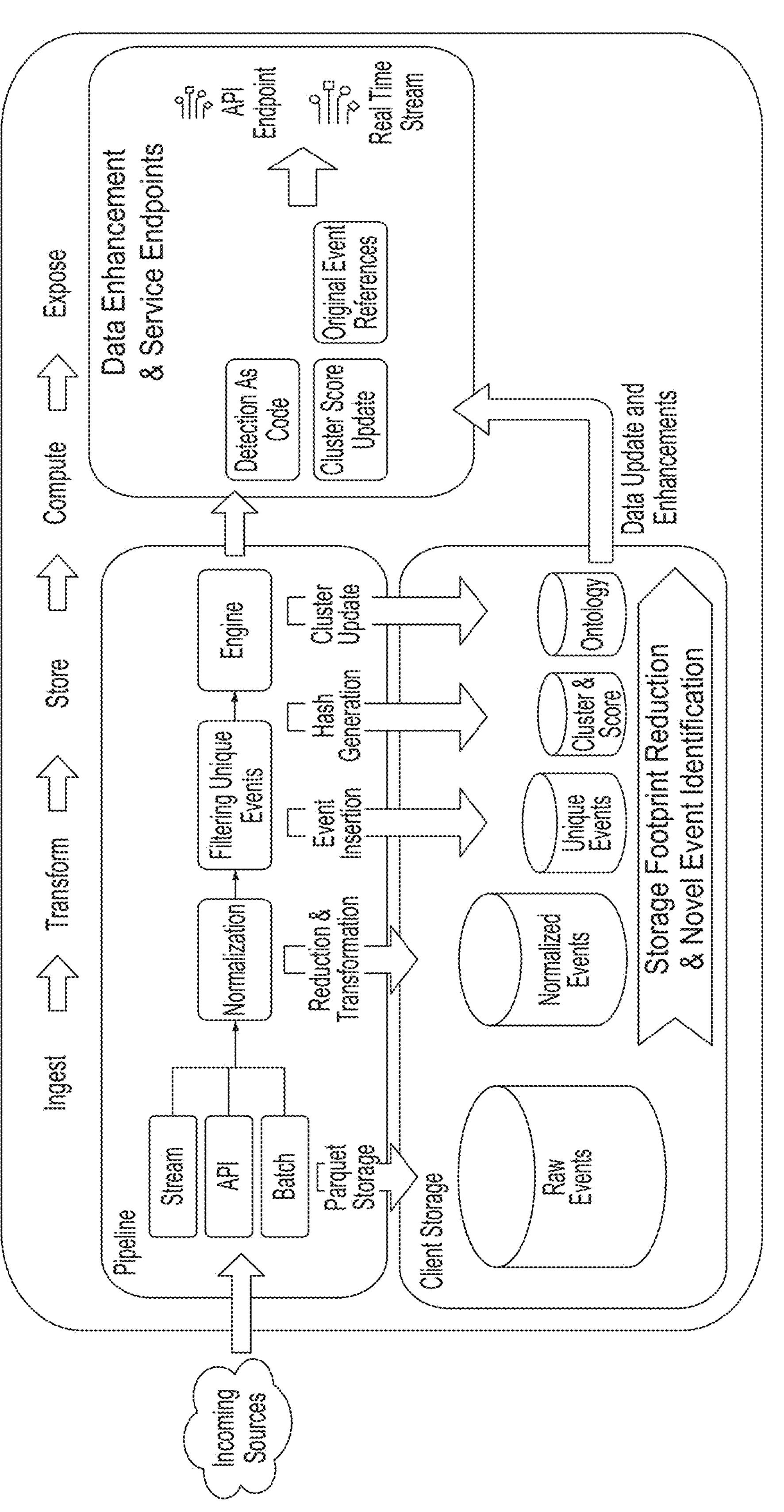
FIG. 10 shows a flow diagram depicting an example process of identifying commonality in computer events, according to an embodiment.

FIG. 10 depicts a flow diagram of a process of identifying commonality in computer events. The process can be executed by a system, such as the system 10 of FIG. 1. The process includes ingestion, transforming, storing, computing, and exposing. The system 10 includes a pipeline for executing processes on data and client storage including multiple databases for storing and/or organizing data. The system 10 further includes data enhancement and service endpoints for further processing of the data. Ingestion includes a pipeline receiving data from incoming sources. In some implementations, the pipeline includes a natural language processing model configured to categorize data. The data can include events, logs, and/or the like. The data can be ingested and/or received via a stream, API, or batch. The raw event data is stored, using, for example, parquet storage, in a raw event database. The raw event database stores the data so the data can be accessed later and/or used as a backup.

The ingested and/or received data is transformed. Transformation can include normalization such as, for example, reduction and transformation of the event data. The normalized event data is then stored in a normalized event database. Normalization can include ID format normalization. In some implementations, a large language model can be used for normalization. In some embodiments, a user can modify normalized data. The normalized data is filtered for unique events to define event shards. The unique events are stored in a unique event database.

The event data is then clustered based on similarity between the data. For example, clustering can be based on random projection, Simhash, MinHash, and/or the like, as described herein. The clusters are scored by assigning a values to the cluster. In some implementations, the score of a cluster can be based on the size of the cluster to other clusters. In some implementations, scoring and clustering is dynamic as new data is added. The scores and the clusters are stored in a database. The clusters are fit into an ontology based on the event shard. In some embodiments, the ontology categories can be predetermined or can be generated to make new ontology categories.

Figure 11:
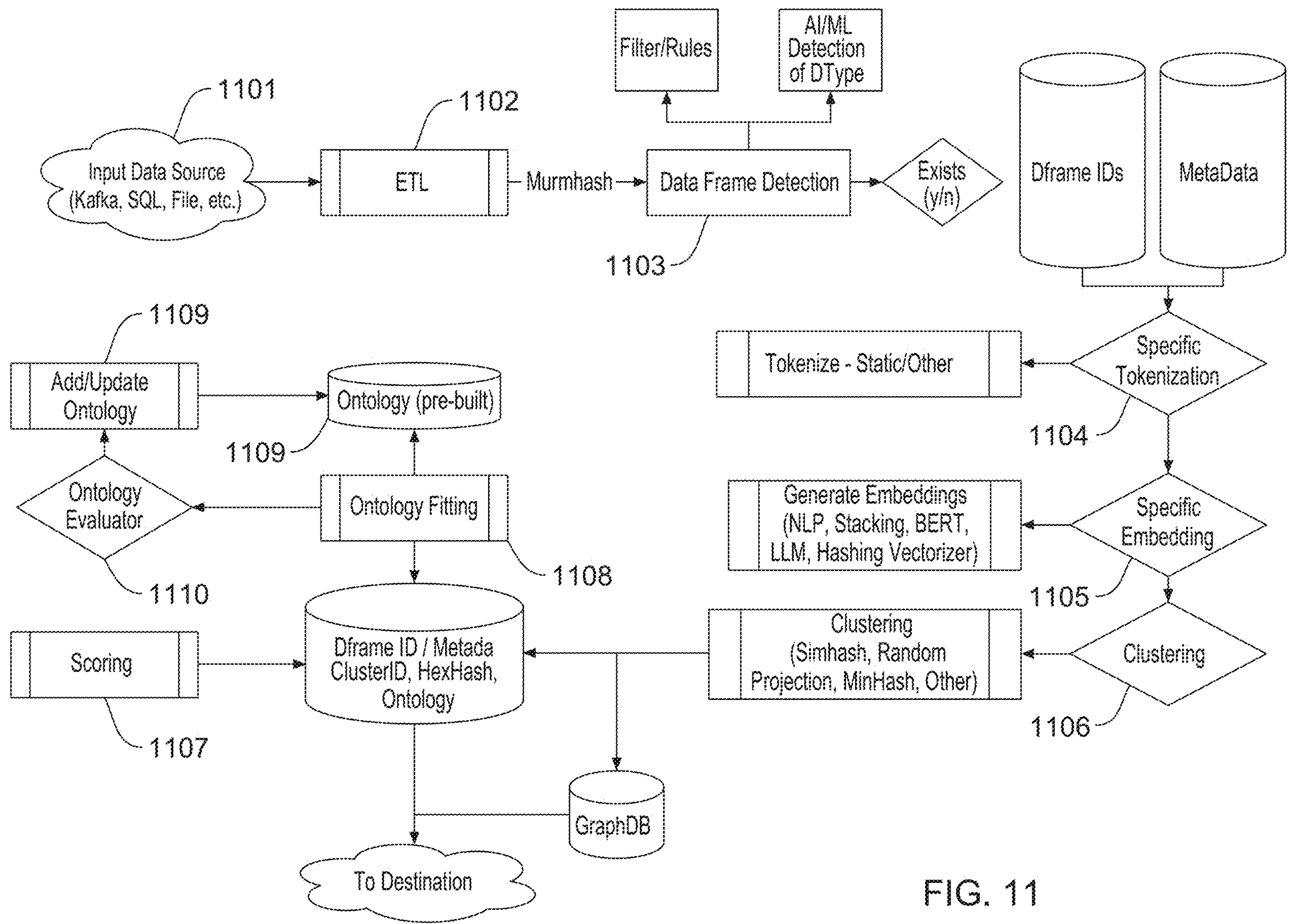
FIG. 11 shows a flow diagram depicting an example process for ontology generation, according to an embodiment.

Ontology fitting and creation is further described in reference to FIG. 11. The ontologies are then stored in an ontology database and the event data can then be enhanced during data enhancement. Data enhancement can include detecting code, updating clusters (e.g., cluster score) based on new data, and/or applying rules, such as a cluster rule seen in FIG. 12. In some implementation, the cluster rules can be similar to a search. A cluster rule can be a user input of a "data event" that is nearly identical to events in a clusters/cohort assignment so that events similar to the data event are clustered. The user can construct and/or define a rule and an associated data element can be provided to the pipeline. The data is normalized, data-type identified, tokenized, embedded and then assigned to a cluster. The data is then provided an associated score and ontology. The result of the cluster rules is that a user can search for and obtain an example event that the user can then use to identify similar events. The system can also return a cohort ID that corresponds to the cluster rule associated with the data and/or the data can remain in a cluster by itself until a related event is observed. The cluster rule triggers when an event is found that can be clustered with the event associated with the cluster rule. In addition to the cluster rule logic, the Boolean rule logic can also be used in conjunction to form a hybrid cluster/Boolean search or rule alert. After the cluster rule allows for finding of at least one similar events, an output ontology and/or cluster can be displayed to a user so that the user can determine similar events based on the cluster rule.

The output of the data enhancement can be sent to an API endpoint or streamed in substantially real time for review by a user. The output can be a dashboard that shows clusters and/or ontology to allow for filtering of events, event types, abnormal events, detection, outliers, and/or the like. The data outputted by the process is aggregated so that a user can review a large amount of data in an organized format.

Figure 15:
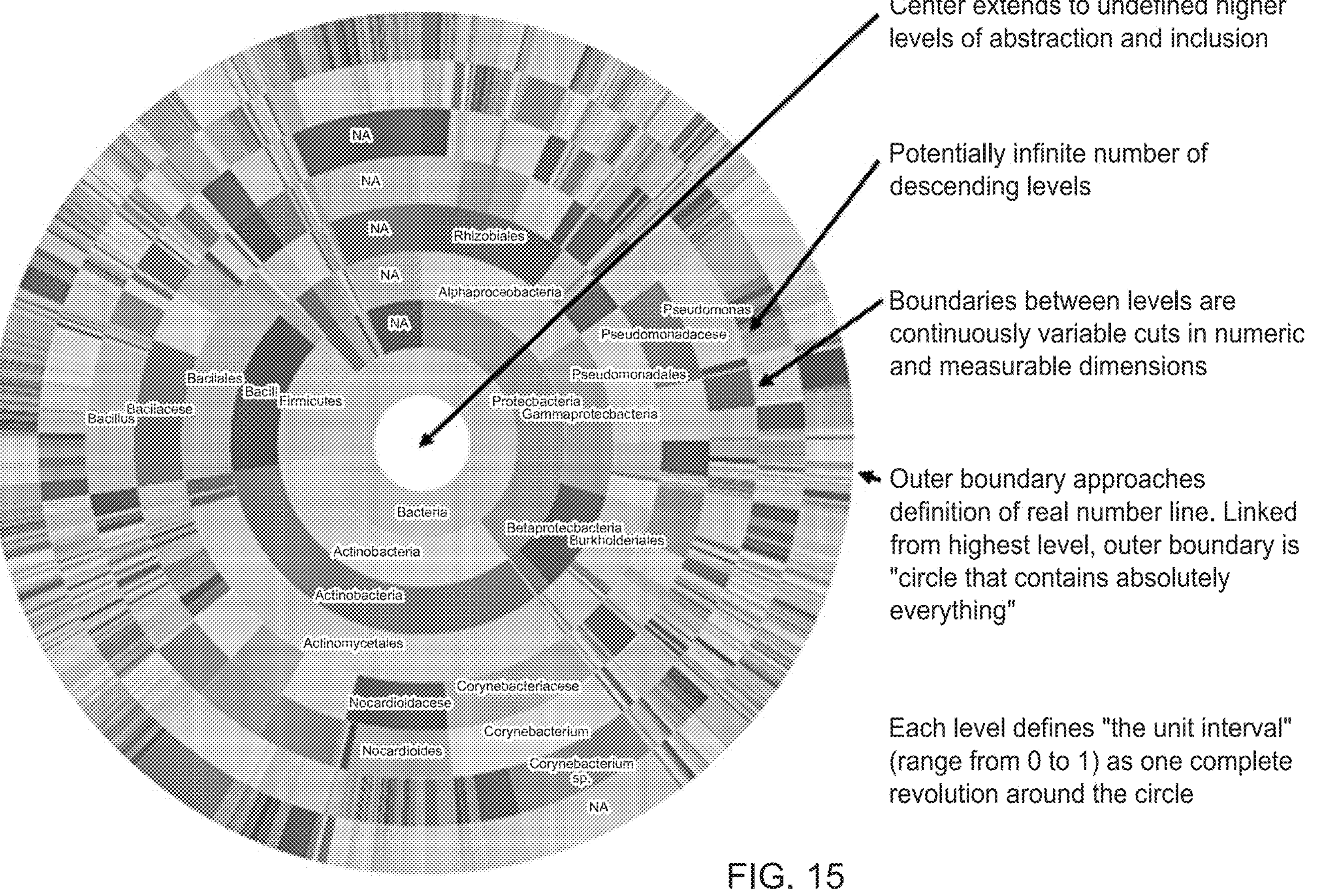
FIG. 15 depicts an example hierarchical ontology, according to an embodiment.

FIG. 11 shows a flow diagram depicting an example process of fitting data to an ontology, according to an embodiment. The ontology can include one or more categories that are predefined or generated. In some implementations, and as seen in FIG. 15 ontologies can be hierarchical to reveal relationships between events. In some implementations, the ontologies include three layers of categorization with each layer increasing precision. As seen in FIG. 15, however, the ontology can include any number of layers. The ontologies can describe classes (e.g., users, endpoints, networks, applications, etc.), relationships of how classes are connected, and attributes of the classes such as usernames, operating systems, and/or the like.

As shown in FIG. 11 ontology fitting begins with receiving input data associated with event data from input data sources (e.g., Kafka, SQL, file, etc.), at 1101. The input data is then extracted, transformed, and loaded (ETL), at 1102. In some implementations, a hashing function such as, for example, Murmhash can be used to hash the input data. The data frames (e.g., data fields) of the input data are then detected using filters/rules and/or machine learning detection of data types, at 1103. After detection, the detected data frames are assigned to the associated data. Based on the metadata and the data frame IDs of the event data, the event data is tokenized, at 1104, and then embeddings are generated, at 1105, using, for example, natural language processing, stacking, Bidirectional Encoder Representations from Transformers, large language models, hashing vectorizing, and/or the like. The event data can then be clustered, at 1106, based on the embeddings using, for example, simhash, random projection, MinHash, and/or the like. The clusters can be scored, at 1107, according to similarities.

The clustered event data can be fit to an ontology, at 1108. In some implementations, fitting to an ontology is based on vector embeddings, as seen in FIGS. 16A-16B. As seen in FIG. 16B, when a new event is added to the model, the event can insert the event into the vector space so that an ontology event class can be identified by comparing the proximity of the event to existing labeled events. The vector space can be based on a dense vector search and a sparse vector search. In some implementations, dense vector search and/or sparse vector search is based on a language model. The dense vector search can include searching based on meaning based on transformer embedding models. The sparse vector search is a text-based search that generates vectors based on specific terms (e.g., using term frequency inverse document frequency, Best Match 25, etc.). By using both dense and sparse vector search, both semantic and term-based matches can be determined as similarity matrices. In some implementations, dense vectors ($X_d$) and sparse vectors ($X_s$) can be merged into a hybrid vector space by calculating similarity matrices for dense and space vector spaces, as seen below.

$$X_d = x_{A_d} \cdot x_{B_d}$$

$$X_s = x_{A_s} \cdot x_{B_s}$$

The similarity matrices can then be merged using an additive function scaled using a scaling factor (α), as seen below.

$$X_h = \alpha * X_d + (1 - \alpha) * X_s$$

Figure 17:
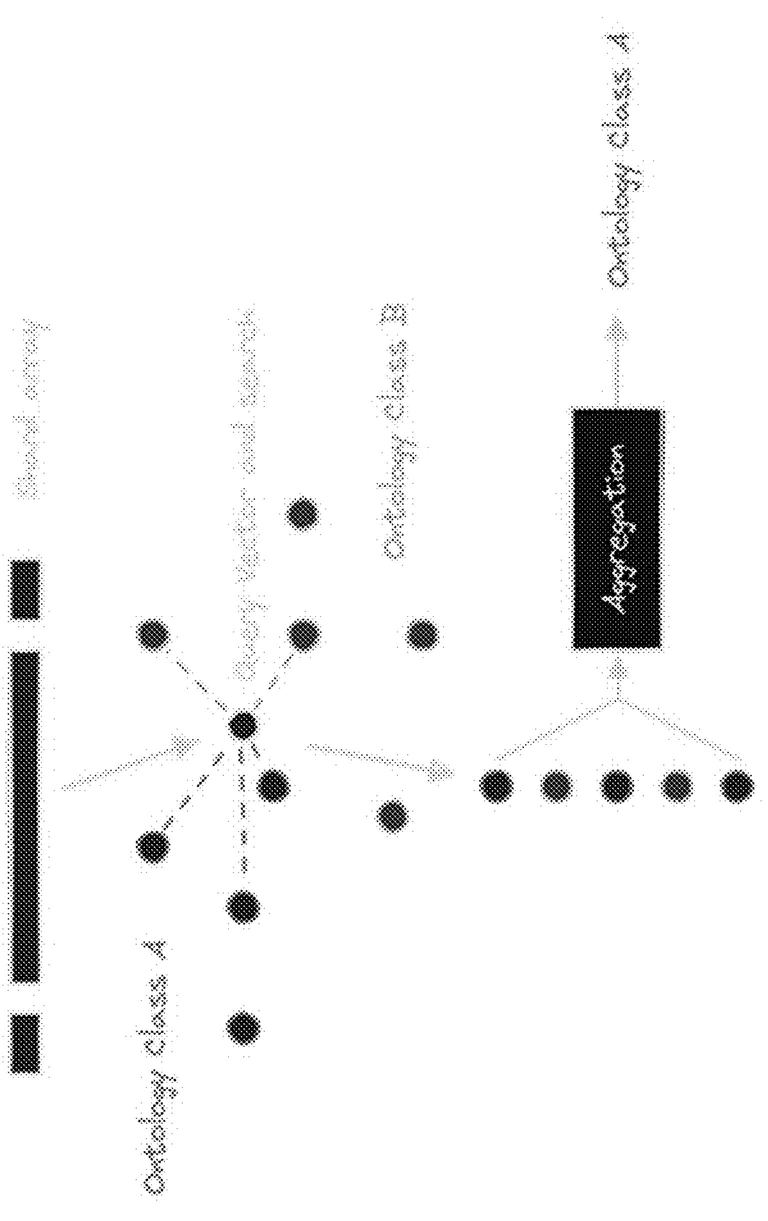
FIG. 17 depicts an example ontology class tree according to an embodiment.

The similarity matrices can be used to fit the events to an ontology cohort, as seen in FIG. 17. Prelabelled events, at 1109, are compared to new events in the vector space. In some implementations, parallel matrix computation is used to reduce latency and increase throughput. In some implementations, semantically similar clusters are retrieved by applying a similarity measurement (e.g., distance measurement) such as Euclidean distance or cosine similarity at the dense embedding level. In some implementations, dense vector embedding are calculated per event during ontology fitting.

The most similar ontology labels are returned, and the event is assigned to the most likely ontology cohort by an ontology evaluator, at 1110. The ontology evaluator is configured to determine if an event is to be assigned to an ontology cohort based on a similarity being the highest. In some implementations, if the ontology cohort similarity is too low (e.g., below a threshold), the ontology evaluator can assign to a catch-all ontology cohort that includes uncategorized, miscellaneous, and/or the like events that are not assigned to another ontology cohort. In some implementations, if an ontology similarity is too low, a new ontology label can be created for an event and/or cluster, at 1111. In some implementations, the new ontology label can be created if the catch-all ontology cohort includes a number of events that are greater than a threshold. In such a manner, new ontology labels can be defined when a predefined number of similar uncharacterized events are identified. The ontology label can be generated using one or more machine learning models (e.g., large language model, natural language processing, etc.). The event and/or cluster is fitted to the generated ontology cohort which is stored in an ontology database.

Figure 13:
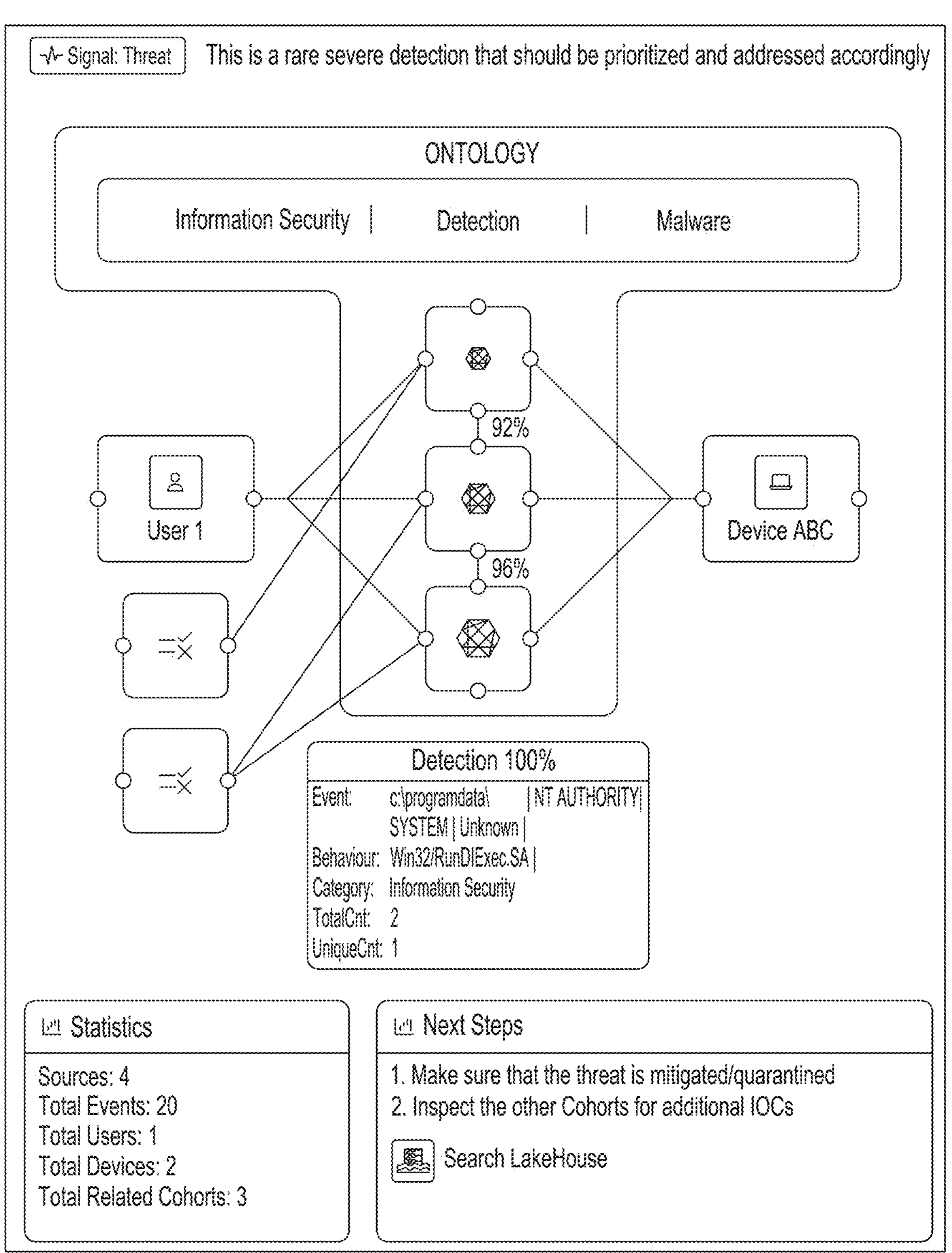
FIG. 13 shows an example of a detection alert process, according to an embodiment.
Figure 14A:
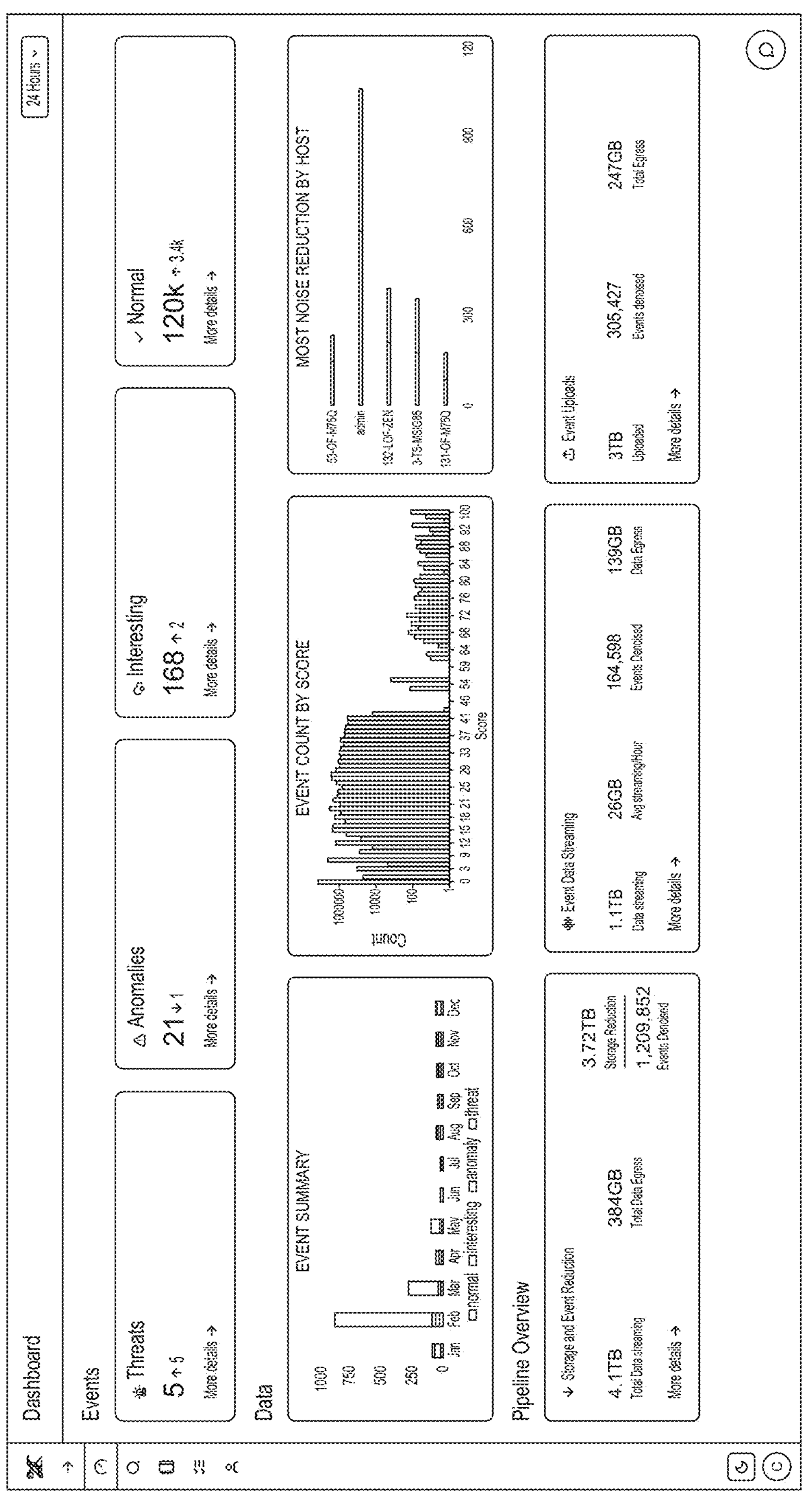

As seen in FIG. 13, the ontologies can indicate a level of threat detected. The detected ontologies can show relationships to user, events, devices, and/or the like. The similarities between clusters or cohorts can be shown. For example, if the similarity between clusters or cohorts is greater than a predetermined threshold, the similar clusters or cohorts will be shown. The events, clusters or cohorts can be shown on a dashboard, as seen in FIGS. 13-14B. The dashboard can include ontology detection, threat levels, suggested mitigation recommendations, statistics, threats, events, anomalies, flags, data processing information, and/or the like. The data on the dashboard from the ontologies is organized, as seen in FIG. 14B, so that a user can interact with the data to find associated information for review and/or remediation of threats.

In some embodiments, a method includes receiving, from a plurality of sources, data associated with a plurality of events at the plurality of sources. The method includes standardizing the data based on a set of predefined standardization rules to define standardized data. The method includes defining a vector representation for each event from the plurality of events based on the standardized data. The method includes assigning each event from the plurality of events to at least one cohort from a plurality of cohorts based on a similarity associated with the vector representation for that event and each cohort from the plurality of cohorts. The method includes generating, using at least one machine learning model, an ontology based on a set of cohorts from the plurality of cohorts and associated with the plurality of events. The method includes storing the plurality of events as associated with the ontology such that the plurality of events can be filtered based on the ontology.

In some implementations, the defining the vector representation includes defining the vector representation for each event from the plurality of events using a hybrid vector space based on both a dense vector search and a sparse vector search.

In some implementations, the at least one machine learning model includes a large language model.

In some implementations, the ontology includes a plurality of categories.

In some implementations, the method further includes assigning the plurality of cohorts to the ontology.

In some implementations, the method further includes generating a confidence score associated with assigning the plurality of cohorts to the ontology.

In some implementations, the method further includes calculating the similarity associated with the vector representation for an event from the plurality of events and each cohort from the plurality of cohorts based on a locality sensitive hashing (LSH) function.

In some implementations, the method further includes identifying a set of anomalous events based on the similarity associated with the vector representation for each event from the plurality of events.

In some embodiments, a method includes receiving, from a source from a plurality of sources, data associated with an event at the source, the data including an event timestamp and an event data-frame. The method includes defining a standardized event based on the event by parsing the data to map predefined data fields within the event data-frame based on predefined standardization rules. The method includes calculating an identifier for the event by providing a representation of the standardized event as an input to a predefined function. The method includes calculating a similarity of the identifier to an identifier associated with each event cohort from a plurality of event cohorts. The method includes assigning the event to an event cohort from the plurality of event cohorts based on the similarity meeting a criterion of that cohort. The method includes assigning the event to an ontology from a plurality of ontologies based on the event cohort being associated with the ontology. The method includes storing the event as associated with the ontology such that the event can be filtered based on the ontology.

In some implementations, the method includes generating, based on the plurality of ontologies, a knowledge graph.

In some implementations, each ontology from the plurality of ontologies includes at least one category.

In some implementations, the method includes generating a plurality of confidence scores associated with the event and the plurality of ontologies.

In some implementations, the method includes, based on each confidence score from the plurality of confidence scores being below a threshold for each ontology from the plurality of ontologies, generating, using a machine learning model based on the event, a new ontology, and assigning the event to the new ontology.

In some implementations, the machine learning model is a large langue model.

In some implementations, the threshold is associated with a mean confidence score associated with a plurality of events associated with each ontology from the plurality of ontologies.

In some embodiments, a non-transitory processor-readable medium stores code representing instructions to be executed by one or more processor. The instructions include code to cause the one or more processors to receive, from a plurality of sources, data associated with a plurality of events at the plurality of sources. The instructions include code to cause the one or more processors to standardize the data based on a set of predefined standardization rules to define standardized data. The instructions include code to cause the one or more processors to define a vector representation for each event from the plurality of events based on the standardized data. The instructions include code to cause the one or more processors to calculate a similarity associated with the vector representation for each event from the plurality of events and a plurality of cohorts using a coarse sorting process and a fine sorting process. The instructions include code to cause the one or more processors to assign each event from the plurality of events to at least one cohort from the plurality of cohorts based on the similarity associated with the vector representation for that event and each cohort from the plurality of cohorts. The instructions include code to cause the one or more processors to assign each cohort from the plurality of cohorts to an ontology. The instructions include code to cause the one or more processors to generate a score associated with each event from the plurality of events based on the ontology. The instructions include code to cause the one or more processors to identify an anomalous event from the plurality of events based on the score associated with that event not meeting a criterion.

In some implementations, the coarse sorting process includes using a locality sensitive hashing (LSH) function.

In some implementations, the code to cause the one or more processors to calculate includes code to cause the one or more processors to calculate the similarity based on at least one of a cosine similarity, a hamming distance, a nearest neighbor search, a dot product similarity, or a Euclidean distance.

In some implementations, the ontology includes a plurality of categories.

In some implementations, the code to cause the one or more processors to define the vector representation includes code to cause the one or more processors to define the vector representation for each event from the plurality of events using a hybrid vector space based on both a dense vector search and a sparse vector search.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices;

magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory processor-readable medium storing code representing instructions to be executed by one or more processors, the instructions comprising code to cause the one or more processors to:

receive, from a plurality of sources, data associated with a plurality of events at the plurality of sources;

standardize the data based on a set of predefined standardization rules to define standardized data;

define a vector representation for each event from the plurality of events based on the standardized data;

calculate a similarity associated with the vector representation for each event from the plurality of events and a plurality of cohorts using a coarse sorting process and a fine sorting process;

assign each event from the plurality of events to at least one cohort from the plurality of cohorts based on the similarity associated with the vector representation for that event and each cohort from the plurality of cohorts;

assign each cohort from the plurality of cohorts to an ontology;

generate a confidence score associated with each event from the plurality of events based on the ontology, the confidence score associated with assigning the plurality of cohorts to the ontology; and identify an anomalous event from the plurality of events based on the confidence score associated with that event not meeting a criterion.

2. The non-transitory processor-readable medium of claim 1, wherein the coarse sorting process includes using a locality sensitive hashing (LSH) function.

3. The non-transitory processor-readable medium of claim 1, wherein the code to cause the one or more processors to calculate includes code to cause the one or more processors to calculate the similarity based on at least one of a cosine similarity, a hamming distance, a nearest neighbor search, a dot product similarity, or a Euclidean distance.

4. The non-transitory processor-readable medium of claim 1, wherein the ontology includes a plurality of categories.

5. The non-transitory processor-readable medium of claim 1, wherein the code to cause the one or more processors to define the vector representation includes code to cause the one or more processors to define the vector representation for each event from the plurality of events using a hybrid vector space based on both a dense vector search and a sparse vector search.

6. The non-transitory processor-readable medium of claim 1, wherein the ontology is a first ontology and the confidence score is a first score, the instructions further comprising code to cause the one or more processors to:

generate a second score for an event based on the first ontology;

based on the second score for the event being below a threshold for the first ontology, generate, using a machine learning model and based on the event, a second ontology; and assign the event to the second ontology.

7. A method, comprising:

receiving, from a plurality of sources, data associated with a plurality of events at the plurality of sources;

standardizing the data based on a set of predefined standardization rules to define standardized data;

defining a vector representation for each event from the plurality of events based on the standardized data;

calculating a similarity associated with the vector representation for each event from the plurality of events and a plurality of cohorts using a coarse sorting process and a fine sorting process;

assigning each event from the plurality of events to at least one cohort from the plurality of cohorts based on the similarity associated with the vector representation for that event and each cohort from the plurality of cohorts;

assigning each cohort from the plurality of cohorts to an ontology;

generating a confidence score associated with each event from the plurality of events based on the ontology, the confidence score associated with assigning the plurality of cohorts to the ontology; and identifying an anomalous event from the plurality of events based on the confidence score associated with that event not meeting a criterion.

8. The method of claim 7, wherein the coarse sorting process includes using a locality sensitive hashing (LSH) function.

9. The method of claim 7, wherein the calculating includes calculating the similarity based on at least one of a cosine similarity, a hamming distance, a nearest neighbor search, a dot product similarity, or a Euclidean distance.

10. The method of claim 7, wherein the ontology includes a plurality of categories.

11. The method of claim 7, wherein the defining includes defining the vector representation for each event from the plurality of events using a hybrid vector space based on both a dense vector search and a sparse vector search.

12. The method of claim 7, wherein the ontology is a first ontology, the method further comprising:

generating a second score for an event based on the first ontology;

based on the second score for the event being below a threshold for the first ontology, generating, using a machine learning model and based on the event, a second ontology; and assigning the event to the second ontology.

13. An apparatus, comprising:

a processor, and a non-transitory, processor-readable medium storing instructions that, when executed by the processor, cause the processor to:

receive, from a plurality of sources, data associated with a plurality of events at the plurality of sources, standardize the data based on a set of predefined standardization rules to define standardized data, define a vector representation for each event from the plurality of events based on the standardized data, calculate a similarity associated with the vector representation for each event from the plurality of events and a plurality of cohorts using a coarse sorting process and a fine sorting process, assign each event from the plurality of events to at least one cohort from the plurality of cohorts based on the similarity associated with the vector representation for that event and each cohort from the plurality of cohorts, assign each cohort from the plurality of cohorts to an ontology, generate a confidence score associated with each event from the plurality of events based on the ontology, the confidence score associated with assigning the plurality of cohorts to the ontology, and identify an anomalous event from the plurality of events based on the confidence score associated with that event not meeting a criterion.

14. The apparatus of claim 13, wherein the coarse sorting process includes using a locality sensitive hashing (LSH) function.

15. The apparatus of claim 13, wherein the instructions to cause the processor to calculate include instructions to cause the processor to calculate the similarity based on at least one of a cosine similarity, a hamming distance, a nearest neighbor search, a dot product similarity, or a Euclidean distance.

16. The apparatus of claim 13, wherein the ontology includes a plurality of categories.

17. The apparatus of claim 13, wherein the instructions to cause the processor to define the vector representation include instructions to cause the processor to define the vector representation for each event from the plurality of events using a hybrid vector space based on both a dense vector search and a sparse vector search.

* * * * *